United States Patent
Shimizu

(10) Patent No.: US 11,769,349 B2
(45) Date of Patent: Sep. 26, 2023

(54) INFORMATION PROCESSING SYSTEM, DATA ACCUMULATION APPARATUS, DATA GENERATION APPARATUS, INFORMATION PROCESSING METHOD, DATA ACCUMULATION METHOD, DATA GENERATION METHOD, RECORDING MEDIUM AND DATABASE

(71) Applicant: NEC Corporation, Tokyo (JP)

(72) Inventor: Yuta Shimizu, Tokyo (JP)

(73) Assignee: NEC CORPORATION, Tokyo (JP)

( * ) Notice: Subject to any disclaimer, the term of this patent is extended or adjusted under 35 U.S.C. 154(b) by 99 days.

(21) Appl. No.: 17/619,016

(22) PCT Filed: Jul. 29, 2020

(86) PCT No.: PCT/JP2020/029113
§ 371 (c)(1),
(2) Date: Dec. 14, 2021

(87) PCT Pub. No.: WO2022/024272
PCT Pub. Date: Feb. 3, 2022

(65) Prior Publication Data
US 2022/0351544 A1    Nov. 3, 2022

(51) Int. Cl.
*G06V 40/16* (2022.01)
(52) U.S. Cl.
CPC .......... *G06V 40/176* (2022.01); *G06V 40/161* (2022.01); *G06V 40/171* (2022.01)
(58) Field of Classification Search
CPC .. G06V 40/176; G06V 40/161; G06V 40/171; G06V 40/174; G06V 40/172;
(Continued)

(56) References Cited

U.S. PATENT DOCUMENTS

| | | | |
|---|---|---|---|
| 2009/0087099 A1* | 4/2009 | Nakamura | H04N 23/61 382/190 |
| 2009/0285456 A1* | 11/2009 | Moon | G06V 40/176 382/118 |

(Continued)

FOREIGN PATENT DOCUMENTS

| | | |
|---|---|---|
| JP | H07-044725 | 2/1995 |
| JP | H08-293038 A | 11/1996 |

(Continued)

OTHER PUBLICATIONS

International Search Report for PCT Application No. PCT/JP2020/029113, dated Sep. 24, 2020.

*Primary Examiner* — Nimesh Patel
(74) *Attorney, Agent, or Firm* — Sughrue Mion, PLLC

(57) ABSTRACT

A data accumulation apparatus has: a detecting device that detects, based on a face image in which a face of a human is included, a first landmark of the face; an obtaining device that obtains a state information indicating a state including at least one of an action unit, an emotion and a physical condition of the human included in the face image; and a database generating device that generates a landmark database that includes first landmarks with each of which the state information is associated and which are categorized by a unit of the facial part. A data generation apparatus has: a selecting device that selects at least one first landmark with which the state information indicating that the state is a desired state is associated for each facial part as a second landmark from the landmark database; and a face data generating device that generates a face data that represents a characteristic of a face of a virtual human by using second landmarks by combining the second landmarks that correspond to the facial parts, respectively.

12 Claims, 14 Drawing Sheets

(58) Field of Classification Search
CPC ...... G06V 40/168; G06V 40/20; G06V 20/40;
G06V 40/175; G06V 20/46; G06V 40/18;
G06V 40/70; G06V 20/64; G06V 20/52;
G06V 10/82; G06V 40/165; G06V 40/16;
G06V 40/19; G06V 10/764; G06V 10/40;
G06V 40/1365; G06V 40/40; G06V
10/255; G06V 10/7715; G06V 40/178;
G06V 10/245; G06V 40/166; G06V
20/20; G06V 20/653; G06V 40/173;
G06V 10/507; G06V 10/96; G06V 40/28;
G06V 40/113; G06V 20/597; G06V
20/698; G06V 40/1388; G06V 40/1394;
G06V 40/15; G06V 40/197; G06T 7/00;
G06T 2207/30201; G06T 2207/10016;
G06T 2207/20081; G06T 7/337; G06T
7/344; G06T 11/00; G06T 13/20; G06T
13/80; G06T 17/00; G06T 2207/20084;
G06T 2200/04; G06T 2207/10004; G06T
7/0014; G06T 7/11; G06T 7/20; G06T
19/003; G06T 19/20; G06T 2207/30196;
G06T 7/593; G06T 7/74; G06T 9/002;
G06T 2207/20101; G06T 2207/30232;
G06T 7/248; G06T 7/60; G06T 7/70;
G06T 19/00; G06T 7/246; G06T 7/0012;
G06T 2207/10028; G06T 7/55; G06T
2207/10021; G06T 2207/10048; G06T
2207/20021; G06T 2207/30004; G06T
2207/30244; G06T 2211/412; G06T
7/0008; G06T 7/292; G06T 7/33; A61B
5/163; A61B 5/1128; A61B 5/7264; A61B
5/1118; A61B 5/1176; G10L 25/63; G10L
25/57; G10L 17/26; G10L 15/063; G10L
17/04; G10L 15/16; G10L 15/18; G06F
3/013; G06F 3/005; G06F 21/32; G06F
21/31; G06F 1/3231; G06F 2203/0381;
G06F 2203/011; G06F 2221/2117; G06F
2221/2113; G06F 3/017; G06F 16/00;
G06F 3/0487; G06F 11/3438; G06F
16/786; G06F 18/00

See application file for complete search history.

(56) References Cited

U.S. PATENT DOCUMENTS

| | | | | |
|---|---|---|---|---|
| 2010/0054550 | A1* | 3/2010 | Okada | G06V 40/175 |
| | | | | 382/118 |
| 2010/0086215 | A1* | 4/2010 | Bartlett | G06V 40/20 |
| | | | | 382/224 |
| 2011/0158542 | A1* | 6/2011 | Kato | G06T 1/00 |
| | | | | 382/254 |
| 2013/0251267 | A1 | 9/2013 | Kafuku et al. | |
| 2015/0086121 | A1* | 3/2015 | Morishita | G06V 40/165 |
| | | | | 382/201 |
| 2020/0026347 | A1* | 1/2020 | el Kaliouby | G06V 40/176 |
| 2020/0175262 | A1* | 6/2020 | Pitre | G06V 40/172 |
| 2021/0000404 | A1* | 1/2021 | Wang | G16H 30/40 |
| 2022/0139107 | A1* | 5/2022 | Cheng | G06V 10/82 |
| | | | | 382/181 |

FOREIGN PATENT DOCUMENTS

| | | |
|---|---|---|
| JP | 2000-067218 A | 3/2000 |
| JP | 2002-342769 A | 11/2002 |
| JP | 2010-061465 A | 3/2010 |
| JP | 2012-203592 A | 10/2012 |
| JP | 5949030 B | 7/2016 |

\* cited by examiner

| ID | LANDMARK DATA FIELD | | ATTRIBUTE DATA FIELD | | ACTION UNIT DATA FIELD | | | |
|---|---|---|---|---|---|---|---|---|
| | POSITION INFORMATION | PART INFORMTION | $\theta$_pan | $\theta$_tilt | AU#1 | AU#2 | ... | AU#k |
| #1 | xxxxxx | BROW | 5° | 15° | YES | NO | ... | NO |
| #2 | xxxxxx | EYE | 12° | −15° | NO | YES | ... | NO |
| #3 | xxxxxx | NOSE | 30° | 0° | NO | YES | ... | NO |
| ... | | | | | | | | |
| #90 | xxxxxx | EYE | 20° | 0° | NO | YES | ... | YES |
| #91 | xxxxxx | BROW | 5° | −35° | NO | NO | ... | YES |
| #92 | xxxxxx | MOUTH | −15° | 20° | YES | NO | ... | YES |
| ... | | | | | | | | |

FIG. 13

|     | LANDMARK DATA FIELD | | ACTION UNIT DATA FIELD | | | |
| --- | --- | --- | --- | --- | --- | --- |
| ID  | POSITION INFORMATION | PART INFORMTION | AU#1 | AU#2 | ... | AU#k |
| #1  | xxxxxx | BROW  | YES | NO  | ... | NO  |
| #2  | xxxxxx | EYE   | NO  | YES | ... | NO  |
| #3  | xxxxxx | NOSE  | NO  | YES | ... | NO  |
| ... | | | | | | |
| #90 | xxxxxx | EYE   | NO  | YES | ... | YES |
| #91 | xxxxxx | BROW  | NO  | NO  | ... | YES |
| #92 | xxxxxx | MOUTH | YES | NO  | ... | YES |
| ... | | | | | | |

FIG. 20

|     | LANDMARK DATA FIELD | | ATTRIBUTE DATA FIELD | |
| --- | --- | --- | --- | --- |
| ID  | POSITION INFORMATION | PART INFORMTION | $\theta\_pan$ | $\theta\_tilt$ |
| #1  | xxxxxx | BROW  | 5°   | 15°  |
| #2  | xxxxxx | EYE   | 12°  | −15° |
| #3  | xxxxxx | NOSE  | 30°  | 0°   |
| ... | | | | |
| #90 | xxxxxx | EYE   | 20°  | 0°   |
| #91 | xxxxxx | BROW  | 5°   | −35° |
| #92 | xxxxxx | MOUTH | −15° | 20°  |
| ... | | | | |

| ID | LANDMARK DATA FIELD | | ATTRIBUTE DATA FIELD | | | ACTION UNIT DATA FIELD | | |
|---|---|---|---|---|---|---|---|---|
| | POSITION INFORMATION | PART INFORMTION | $\theta\_pan$ | $\theta\_tilt$ | ASPECT RATIO | AU#1 | ... | AU#k |
| #1 | xxxxxx | BROW | 5° | 15° | 1.42 | YES | ... | NO |
| #2 | xxxxxx | EYE | 12° | −15° | 1.32 | NO | ... | NO |
| #3 | xxxxxx | NOSE | 30° | 0° | 1.40 | NO | ... | NO |
| ... | | | | | | | | |
| #90 | xxxxxx | EYE | 20° | 0° | 1.36 | NO | ... | YES |
| #91 | xxxxxx | BROW | 5° | −35° | 1.34 | NO | ... | YES |
| #92 | xxxxxx | MOUTH | −15° | 20° | 1.48 | YES | ... | YES |
| ... | | | | | | | | |

FIG. 22

INFORMATION PROCESSING SYSTEM, DATA ACCUMULATION APPARATUS, DATA GENERATION APPARATUS, INFORMATION PROCESSING METHOD, DATA ACCUMULATION METHOD, DATA GENERATION METHOD, RECORDING MEDIUM AND DATABASE

This application is a National Stage Entry of PCT/JP2020/029113 filed on Jul. 29, 2020, the contents of all of which are incorporated herein by reference, in their entirety.

TECHNICAL FIELD

The present disclosure relates to a technical field of at least one of an information processing system, a data accumulation apparatus, a data generation apparatus, an information processing method, a data accumulation method, a data generation method and a recording medium that are configured to perform a desired information processing relating to a face of a human and a database that is usable to perform the desired information processing relating to the face of the human, for example.

BACKGROUND ART

As one example of a desired information processing relating to a face of a human, there is an information processing that detects (namely, determines) a motion of at least one of a plurality of facial parts that constitute the face of the human. The motion of the facial part is categorized by a unit that is referred to as an action unit, for example. A detection of this action unit may be performed for a use of predicting a facial expression of the human.

Note that there are Patent Literatures 1 to 4 as a background art document relating to the present disclosure.

CITATION LIST

Patent Literature

Patent Literature 1: JP2000-067218A
Patent Literature 2: JP5949030B
Patent Literature 3: JPH8-293038A
Patent Literature 4: JPH7-044725A

SUMMARY

Technical Problem

It is an example object of the present disclosure to provide an information processing system, a data accumulation apparatus, a data generation apparatus, an information processing method, a data accumulation method, a data generation method, a recording medium and a database that can solve the above described technical problem. By way of example, an example object of the present disclosure is to provide an information processing system, a data accumulation apparatus, a data generation apparatus, an information processing method, a data accumulation method, a data generation method, a recording medium and a database that is configured to properly generate data that is usable for a learning of an apparatus that is configured to determine at least one of an action unit, an emotion and a physical condition.

Solution to Problem

One example aspect of an information processing system of the present disclosure is provided with: a data accumulation collection apparatus; and a data generation apparatus, wherein the data accumulation apparatus is provided with: a detecting device that detects, based on a face image in which a face of a human is included, a landmark of the face of the human as a first landmark; an obtaining device that obtains a state information indicating a state of the human that includes at least one of an action unit relating to a motion of at least one of a plurality of facial parts that constitute the face of the human that is included in the face image, an emotion of the human that is included in the face image and a physical condition of the human that is included in the face image; and a database generating device that generates a landmark database that includes a plurality of first landmarks with each of which the state information is associated and which are categorized by a unit of each of the plurality of facial parts, the data generation apparatus is provided with: a selecting device that selects at least one first landmark with which the state information that indicates that the state is a desired state is associated for each of the plurality of facial parts as a second landmark from the landmark database; and a face data generating device that generates a face data that represents a characteristic of a face of a virtual human by using a plurality of second landmarks by combining the plurality of second landmarks that correspond to the plurality of facial parts, respectively, and that are selected by the selecting device.

One example aspect of a data accumulation apparatus of the present disclosure is provided with: a detecting device that detects, based on a face image in which a face of a human is included, a landmark of the face of the human as a first landmark; an obtaining device that obtains a state information indicating a state of the human that includes at least one of an action unit relating to a motion of at least one of a plurality of facial parts that constitute the face of the human that is included in the face image, an emotion of the human that is included in the face image and a physical condition of the human that is included in the face image; and a database generating device that generates a landmark database that includes a plurality of first landmarks with each of which the state information is associated and which are categorized by a unit of each of the plurality of facial parts.

One example aspect of a data generation apparatus of the present disclosure is provided with: a selecting device that selects, from a landmark database (i) that includes a plurality of first landmarks each of which is a landmark of a face of a human, (ii) in which a state information indicating a state of the human that includes at least one of an action unit relating to a motion of at least one of a plurality of facial parts that constitute the face of the human, an emotion of the human and a physical condition of the human is associated with each of the plurality of first landmarks, and (iii) in which the plurality of first landmarks are categorized by a unit of each of the plurality of facial parts, at least one first landmark with which the state information that indicates that the state is a desired state is associated for each of the plurality of facial parts as a second landmark; and a face data generating device that generates a face data that represents a characteristic of a face of a virtual human by using a plurality of second landmarks by combining the plurality of second landmarks that correspond to the plurality of facial parts, respectively, and that are selected by the selecting device.

One example aspect of an information processing method of the present disclosure includes: detecting, based on a face image in which a face of a human is included, a landmark of the face of the human as a first landmark; obtaining a state information indicating a state of the human that includes at least one of an action unit relating to a motion of at least one of a plurality of facial parts that constitute the face of the human that is included in the face image, an emotion of the human that is included in the face image and a physical condition of the human that is included in the face image; generating a landmark database that includes a plurality of first landmarks with each of which the state information is associated and which are categorized by a unit of each of the plurality of facial parts; selecting at least one first landmark with which the state information that indicates that the state is a desired state is associated for each of the plurality of facial parts as a second landmark from the landmark database; and generating a face data that represents a characteristic of a face of a virtual human by using a plurality of second landmarks by combining the plurality of selected second landmarks that correspond to the plurality of facial parts, respectively.

One example aspect of a data accumulation method of the present disclosure includes: detecting, based on a face image in which a face of a human is included, a landmark of the face of the human as a first landmark; obtaining a state information indicating a state of the human that includes at least one of an action unit relating to a motion of at least one of a plurality of facial parts that constitute the face of the human that is included in the face image, an emotion of the human that is included in the face image and a physical condition of the human that is included in the face image; and generating a landmark database that includes a plurality of first landmarks with each of which the state information is associated and which are categorized by a unit of each of the plurality of facial parts.

One example aspect of a data generation method of the present disclosure includes: selecting, from a landmark database (i) that includes a plurality of first landmarks each of which is a landmark of a face of a human, (ii) in which a state information indicating a state of the human that includes at least one of an action unit relating to a motion of at least one of a plurality of facial parts that constitute the face of the human, an emotion of the human and a physical condition of the human is associated with each of the plurality of first landmarks, and (iii) in which the plurality of first landmarks are categorized by a unit of each of the plurality of facial parts, at least one first landmark with which the state information that indicates that the state is a desired state is associated for each of the plurality of facial parts as a second landmark; and generating a face data that represents a characteristic of a face of a virtual human by using a plurality of second landmarks by combining the plurality of second landmarks that correspond to the plurality of facial parts, respectively, and that are selected by the selecting device.

A first example aspect of a recording medium of the present disclosure is a recording medium on which a computer program that allows a computer to execute an information processing method is recorded, wherein the information processing method includes: detecting, based on a face image in which a face of a human is included, a landmark of the face of the human as a first landmark; obtaining a state information indicating a state of the human that includes at least one of an action unit relating to a motion of at least one of a plurality of facial parts that constitute the face of the human that is included in the face image, an emotion of the human that is included in the face image and a physical condition of the human that is included in the face image; generating a landmark database that includes a plurality of first landmarks with each of which the state information is associated and which are categorized by a unit of each of the plurality of facial parts; selecting at least one first landmark with which the state information that indicates that the state is a desired state is associated for each of the plurality of facial parts as a second landmark from the landmark database; and generating a face data that represents a characteristic of a face of a virtual human by using a plurality of second landmarks by combining the plurality of selected second landmarks that correspond to the plurality of facial parts, respectively.

A second example aspect of a recording medium of the present disclosure is a recording medium on which a computer program that allows a computer to execute a data accumulation method is recorded, wherein the data accumulation method includes: detecting, based on a face image in which a face of a human is included, a landmark of the face of the human as a first landmark; obtaining state information indicating a state of the human that includes at least one of an action unit relating to a motion of at least one of a plurality of facial parts that constitute the face of the human that is included in the face image, an emotion of the human that is included in the face image and a physical condition of the human that is included in the face image; and generating a landmark database that includes a plurality of first landmarks with each of which the state information is associated and which are categorized by a unit of each of the plurality of facial parts.

A third example aspect of a recording medium of the present disclosure is a recording medium on which a computer program that allows a computer to execute a data generation method is recorded, wherein the data generation method includes: selecting, from a landmark database (i) that includes a plurality of first landmarks each of which is a landmark of a face of a human, (ii) in which a state information indicating a state of the human that includes at least one of an action unit relating to a motion of at least one of a plurality of facial parts that constitute the face of the human, an emotion of the human and a physical condition of the human is associated with each of the plurality of first landmarks, and (iii) in which the plurality of first landmarks are categorized by a unit of each of the plurality of facial parts, at least one first landmark with which the state information that indicates that the state is a desired state is associated for each of the plurality of facial parts as a second landmark; and generating a face data that represents a characteristic of a face of a virtual human by using a plurality of second landmarks by combining the plurality of second landmarks that correspond to the plurality of facial parts, respectively, and that are selected by the selecting device.

One example aspect of a database of the present disclosure is a database that includes: a first data field in which a data relating to a plurality of first landmarks each of which is a landmark of a face of a human is allowed to be stored; and a second data field in which a state information indicating a human state that includes at least one of an action unit relating to a motion of at least one of a plurality of facial parts that constitute the face of the human, an emotion of the human and a physical condition of the human is allowed to be stored, the state information being associated with each of the plurality of first landmarks and the plurality of first landmarks are categorized by a unit of each of the plurality of facial parts.

BRIEF DESCRIPTION OF DRAWINGS

FIG. 13 illustrates one example of a data structure of a landmark database.

FIG. 20 illustrates a first modified example of the landmark database that is generated by the data accumulation apparatus.

FIG. 21 illustrates a second modified example of the landmark database that is generated by the data accumulation apparatus.

FIG. 22 illustrates a third modified example of the landmark database that is generated by the data accumulation apparatus.

DESCRIPTION OF EXAMPLE EMBODIMENTS

Hereinafter, an example embodiment of an information processing system, a data accumulation apparatus, a data generation apparatus, an image processing apparatus, an information processing method, a data accumulation method, a data generation method, an image processing method, a recording medium and a database will be described with reference to the drawings. The following describes an information processing system SYS to which the example embodiment of the information processing system, the data accumulation apparatus, the data generation apparatus, the image processing apparatus, the information processing method, the data accumulation method, the data generation method, the image processing method, the recording medium and the database is applied.

Figure 1:
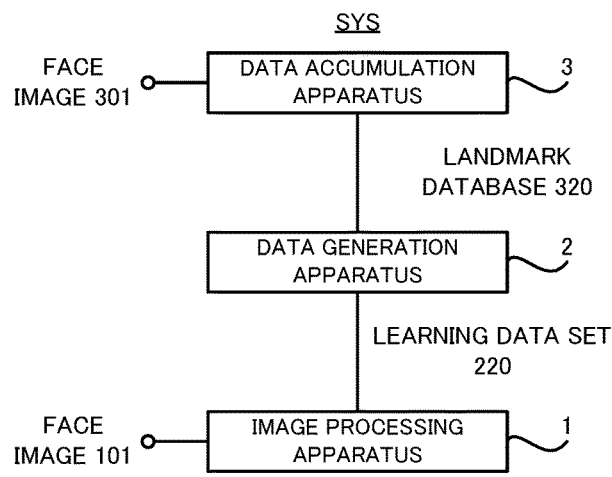
FIG. 1 is a block diagram that illustrates a configuration of an information processing system in a first example embodiment.

(1) Configuration of Information Processing System SYS in First Example Embodiment (1-1) Entire Configuration of Information Processing System SYS Firstly, with reference to FIG. 1, an entire configuration of the information processing system SYS in the first example embodiment will be described. FIG. 1 is a block diagram that illustrates the entire configuration of the information processing system SYS in the first example embodiment.

As illustrated in FIG. 1, the information processing system SYS is provided with an image processing apparatus 1, a data generation apparatus 2 and a data accumulation apparatus 3. The image processing apparatus 1, the data generation apparatus 2 and the data accumulation apparatus 3 may communicate with each other via at least one of a wired communication network and a wireless communication network.

The image processing apparatus 1 performs an image processing using a face image 101 that is generated by capturing an image of a human 100. Specifically, the image processing apparatus 1 performs an action detection operation for detecting (in other words, determining) an action unit that occurs on a face of the human 100 that is included in the face image 101 based on the face image 101. Namely, the image processing apparatus 1 performs an action detection operation for determining whether or not the action unit occurs on the face of the human 100 that is included in the face image 101 based on the face image 101. In the first example embodiment, the action unit means a predetermined motion of at least one of a plurality of facial parts that constitute the face. At least one of a brow, an eyelid, an eye, a cheek, a nose, a lip, a mouth and a jaw is one example of the facial part, for example.

The action unit may be categorized into a plurality of types based on a type of the relevant facial part and a type of the motion of the facial part. In this case, the image processing apparatus 1 may determine whether or not at least one of the plurality of types of action units occurs. For example, the image processing apparatus 1 may detect at least one of an action unit corresponding to a motion that an inner side of the brow is raised, an action unit corresponding to a motion that an outer side of the brow is raised, an action unit corresponding to a motion that the brow is lowered, an action unit corresponding to a motion that an upper lid is raised, an action unit corresponding to a motion that the cheek is raised, an action unit corresponding to a motion that the lid tightens, an action unit corresponding to a motion that the nose wrinkles, an action unit corresponding to a motion that an upper lip is raised, an action unit corresponding to a motion that the eye is like a slit, an action unit corresponding to a motion that the eye is closed and an action unit corresponding to a motion of squinting. Note that the image processing apparatus 1 may use, as the plurality of types of action units, a plurality of action units that are defined by a FACS (Facial Action Coding System), for example. However, the plurality of types of action units are not limited to the plurality of action units that are defined by the FACS.

The image processing apparatus 1 performs the action detection operation by using an arithmetic model that is learnable (hereinafter, it is referred to as a "learning model"). The learning model may be an arithmetic model that outputs an information relating to the action unit that occurs on the face of the human 100 included in the face image 101 when the face image 101 is inputted thereto, for example. However, the image processing apparatus 1 may perform the action detection operation by a method that is different from a method using the learning model.

The data generation apparatus 2 performs a data generation operation for generating a learning data set 220 that is usable to perform the learning of the learning model used by the image processing apparatus 1. The learning of the learning model is performed to improve a detection accuracy of the action unit by the learning model (namely, a detection accuracy of the action unit by the image processing apparatus 1), for example. However, the learning of the learning model may be performed without using the learning data set 220. Namely, a learning method of the learning model is not limited to a learning method using the learning data set 220. In the first example embodiment, the data generation apparatus 2 generates a plurality of face data 221 to generate the learning data set 220 that includes at least a part of the plurality of face data 221. Each face data 221 is a data that represents a characteristic of a face of a virtual (in other words, quasi) human 200 (see FIG. 15 and so on described later) that corresponds to each face data 221. For example, each face data 221 may be a data that represents the characteristic of the face of the virtual human 200 that corresponds to each face data 221 by using a landmark (a feature point) of the face. Furthermore, each face data 221 is a data to which a ground truth label that indicates the type of the action unit occurring on the face of the virtual human 200 that corresponds to the face data 221 is assigned.

The learning model of the image processing apparatus 1 is learned by using the learning data set 220. Specifically, in order to perform the learning of the learning model, a landmark included in the face data 221 is inputted into the learning model. Then, a parameter that defines the learning model (for example, at least one of a weight and a bias of a neural network) is learned based on an output of the learning model and the ground truth label that is assigned to the face data 221. The image processing apparatus 1 performs the action detection operation by using the learning model that has been already learned by using the learning data set 220.

The data accumulation apparatus 3 performs a data accumulation operation for generating a landmark database 320 that is used by the data generation apparatus 2 to generates the learning data set 220 (namely, to generate the plurality of face data 221). Specifically, the data accumulation apparatus 3 collects a landmark of a face of a human 300 included in a face image 301 based on the face image 301 that is generated by capturing an image of the human 300 (see FIG. 6 described below). The face image 301 may be generated by capturing the image of the human 300 on which at least one desired action unit occurs. Alternatively, the face image 301 may be generated by capturing the image of the human 300 on which any type of action unit does not occur. Anyway, an existence and the type of the action unit that occurs in the face of the human 300 included in the face image 301 is an information that is already known to the data accumulation apparatus 3. Furthermore, the data accumulation apparatus 3 generates the landmark database 320 that stores (namely, accumulates or includes) the collected landmark in a state where the type of the action unit occurring on the face of the human 300 is associated with it and it is categorized by the facial parts. Note that a data structure of the landmark database 320 will be described later in detail.

(1-2) Configuration of Image Processing Apparatus 1

Figure 2:
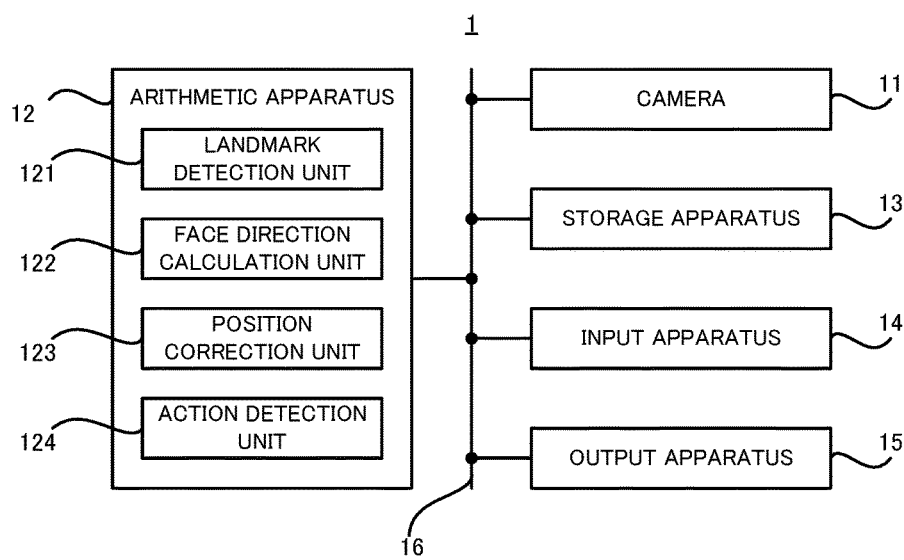
FIG. 2 is a block diagram that illustrates a configuration of a data accumulation apparatus in the first example embodiment.

Next, with reference to FIG. 2, a configuration of the image processing apparatus 1 in the first example embodiment will be described. FIG. 2 is a block diagram that illustrates the configuration of the image processing apparatus 1 in the first example embodiment.

As illustrated in FIG. 2, the image processing apparatus 1 is provided with a camera 11, an arithmetic apparatus 12 and a storage apparatus 13. Furthermore, the image processing apparatus 1 may be provided with an input apparatus 14 and an output apparatus 15. However, the image processing apparatus 1 may not be provided with at least one of the input apparatus 14 and the output apparatus 15. The camera 11, the arithmetic apparatus 12, the storage apparatus 13, the input apparatus 14 and the output apparatus 15 may be interconnected through a data bus 16.

The camera 11 generates the face image 101 by capturing the image of the human 100. The face image 101 generated by the camera 11 is inputted to the arithmetic apparatus 12 from the camera 11. Note that the image processing apparatus 1 may not be provided with the camera 11. In this case, a camera that is disposed outside the image processing apparatus 1 may generate the face image 101 by capturing the image of the human 100. The face image 101 generated by the camera 11 that is disposed outside the image processing apparatus 1 may be inputted to the arithmetic apparatus 12 through the input apparatus 14.

The arithmetic apparatus 12 is provided with a processor that includes at least one of a CPU (Central Processing Unit), a GPU (Graphic Processing Unit), a FPGA (Field Programmable Gate Array), a TPU (Tensor Processing Unit), an ASIC (Application Specific Integrated Circuit) and a quantum processor, for example. The arithmetic apparatus 12 may be provided with single processor or may be provided with a plurality of processors. The arithmetic apparatus 12 reads a computer program. For example, the arithmetic apparatus 12 may read a computer program that is stored in the storage apparatus 13. For example, the arithmetic apparatus 12 may read a computer program that is stored in a non-transitory computer-readable recording medium by using a non-illustrated recording medium reading apparatus. The arithmetic apparatus 12 may obtain (namely, download or read) a computer program from a non-illustrated apparatus that is disposed outside the image processing apparatus 1 through the input apparatus 14 that is configured to serve as a reception apparatus. The arithmetic apparatus 12 executes the read computer program. As a result, a logical functional block for performing an operation (for example, the action detection operation) that should be performed by the image processing apparatus 1 is implemented in the arithmetic apparatus 12. Namely, the arithmetic apparatus 12 is configured to serve as a controller for implementing the logical functional block for performing the operation that should be performed by the image processing apparatus 1.

FIG. 2 illustrates one example of the logical functional block that is implemented in the arithmetic apparatus for performing the action detection operation. As illustrated in FIG. 2, in the arithmetic apparatus 12, a landmark detection unit 121, a face direction calculation unit 122, a position correction unit 123 and an action detection unit 124 are implemented as the logical functional block that is implemented in the arithmetic apparatus for performing the action detection operation. Note that a detail of an operation of each of the landmark detection unit 121, the face direction calculation unit 122, the position correction unit 123 and the action detection unit 124 will be described later in detail, however, a summary thereof will be described briefly here. The landmark detection unit 121 detect a landmark of the face of the human 100 included in the face image 101 based on the face image 101. The face direction calculation unit 122 generates a face angle information that indicates a direction of the face of the human 100 included in the face image 101 by an angle based on the face image 101. The position correction unit 123 generates a position information relating to a position of the landmark that is detected by the landmark detection unit 121 and corrects the generated position information based on the face angle information generated by the face direction calculation unit 122. The action detection unit 124 determines whether or not the action unit occurs on the face of the human 100 included in the face image 101 based on the position information corrected by the position correction unit 123.

The storage apparatus 13 is configured to store a desired data. For example, the storage apparatus 13 may temporarily store the computer program that is executed by the arithmetic apparatus 12. The storage apparatus 13 may temporarily store a data that is temporarily used by the arithmetic apparatus 12 when the arithmetic apparatus 12 executes the computer program. The storage apparatus 13 may store a data that is stored for a long term by the image processing apparatus 1. Note that the storage apparatus 13 may include at least one of a RAM (Random Access Memory), a ROM (Read Only Memory), a hard disk apparatus, a magneto-optical disc, a SSD (Solid State Drive) and a disk array apparatus. Namely, the storage apparatus 13 may include a non-transitory recording medium.

The input apparatus 14 is an apparatus that receives an input of an information from an outside of the image processing apparatus 1 to the image processing apparatus 1. For example, the input apparatus 14 may include an operational apparatus (for example, at least one of a keyboard, a mouse and a touch panel) that is operable by a user of the image processing apparatus 1. For example, the input apparatus 14 may include a reading apparatus that is configured to read an information recorded as a data in a recording medium that is attachable to the image processing apparatus 1. For example, the input apparatus 14 may include a reception apparatus that is configured to receive an information that is transmitted as a data from an outside of the image processing apparatus 1 to the image processing apparatus 1 through a communication network.

The output apparatus 15 is an apparatus that outputs an information to an outside of the image processing apparatus 1. For example, the output apparatus 15 may output an information relating to the action detection operation performed by the image processing apparatus 1 (for example, an information relating to the detected action list). A display that is configured to output (namely, that is configured to display) the information as an image is one example of the output apparatus 15. A speaker that is configured to output the information as a sound is one example of the output apparatus 15. A printer that is configured to output a document on which the information is printed is one example of the output apparatus 15. A transmission apparatus that is configured to transmit the information as a data through the communication network or the data bus is one example of the output apparatus 15.

(1-3) Configuration of Data Generation Apparatus 2

Figure 3:
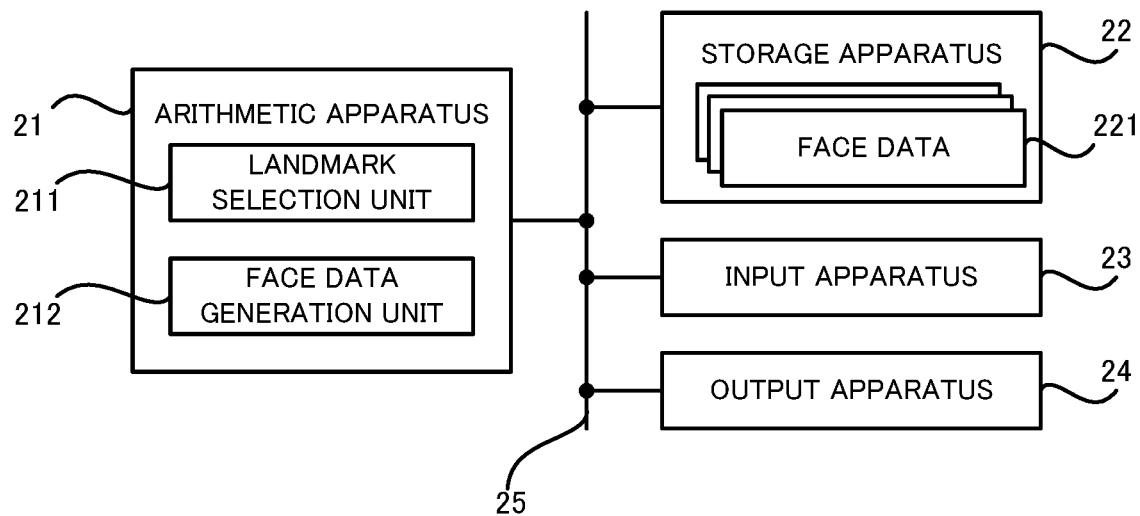
FIG. 3 is a block diagram that illustrates a configuration of a data generation apparatus in the first example embodiment.

Next, with reference to FIG. 3, a configuration of the data generation apparatus 2 in the first example embodiment will be described. FIG. 3 is a block diagram that illustrates the configuration of the data generation apparatus 2 in the first example embodiment.

As illustrated in FIG. 3, the data generation apparatus 2 is provided with an arithmetic apparatus 21 and a storage apparatus 22. Furthermore, the data generation apparatus 2 may be provided with an input apparatus 23 and an output apparatus 24. However, the data generation apparatus 2 may not be provided with at least one of the input apparatus 23 and the output apparatus 24. The arithmetic apparatus 21, the storage apparatus 22, the input apparatus 23 and the output apparatus 24 may be interconnected through a data bus 25.

The arithmetic apparatus 21 includes at least one of the CPU, the GPU and the FPGA, for example. The arithmetic apparatus 21 reads a computer program. For example, the arithmetic apparatus 21 may read a computer program that is stored in the storage apparatus 22. For example, the arithmetic apparatus 21 may read a computer program that is stored in a non-transitory computer-readable recording medium by using a non-illustrated recording medium reading apparatus. The arithmetic apparatus 21 may obtain (namely, download or read) a computer program from a non-illustrated apparatus that is disposed outside the data generation apparatus 2 through the input apparatus 23 that is configured to serve as a reception apparatus. The arithmetic apparatus 21 executes the read computer program. As a result, a logical functional block for performing an operation (for example, the data generation operation) that should be performed by the data generation apparatus 2 is implemented in the arithmetic apparatus 21. Namely, the arithmetic apparatus 21 is configured to serve as a controller for implementing the logical functional block for performing the operation that should be performed by the data generation apparatus 2.

FIG. 3 illustrates one example of the logical functional block that is implemented in the arithmetic apparatus for performing the data generation operation. As illustrated in FIG. 3, in the arithmetic apparatus 21, a landmark selection unit 211 and a face data generation unit 212 are implemented as the logical functional block that is implemented in the arithmetic apparatus for performing the data generation operation. Note that a detail of an operation of each of the landmark selection unit 211 and the face data generation unit 212 will be described later in detail, however, a summary thereof will be described briefly here. The landmark selection unit 211 selects at least one landmark for each of the plurality of facial parts. The face data generation unit 212 combines a plurality of landmarks that correspond to the plurality of facial parts, respectively, and that are selected by the landmark selection unit 211 to generate the face data 211 that represents the characteristic of the face of the virtual human by using the plurality of landmarks.

The storage apparatus 22 is configured to store a desired data. For example, the storage apparatus 22 may temporarily store the computer program that is executed by the arithmetic apparatus 21. The storage apparatus 22 may temporarily store a data that is temporarily used by the arithmetic apparatus 21 when the arithmetic apparatus 21 executes the computer program. The storage apparatus 22 may store a data that is stored for a long term by the data generation apparatus 2. Note that the storage apparatus 22 may include at least one of the RAM, the ROM, the hard disk apparatus, the magneto-optical disc, the SSD and the disk array apparatus. Namely, the storage apparatus 22 may include a non-transitory recording medium.

The input apparatus 23 is an apparatus that receives an input of an information from an outside of the data generation apparatus 2 to the data generation apparatus 2. For example, the input apparatus 23 may include an operational apparatus (for example, at least one of a keyboard, a mouse and a touch panel) that is operable by a user of the data generation apparatus 2. For example, the input apparatus 23 may include a reading apparatus that is configured to read an information recorded as a data in a recording medium that is attachable to the data generation apparatus 2. For example, the input apparatus 23 may include a reception apparatus that is configured to receive an information that is transmitted as a data from an outside of the data generation apparatus 2 to the data generation apparatus 2 through a communication network.

The output apparatus 24 is an apparatus that outputs an information to an outside of the data generation apparatus 2. For example, the output apparatus 24 may output an information relating to the data generation operation performed by the data generation apparatus 2. For example, the output apparatus 24 may output to the image processing apparatus 1 the learning data set 220 that includes at least a part of the plurality of face data 221 generated by the data generation operation. A transmission apparatus that is configured to transmit the information as a data through the communication network or the data bus is one example of the output apparatus 24. A display that is configured to output (namely, that is configured to display) the information as an image is one example of the output apparatus 24. A speaker that is configured to output the information as a sound is one example of the output apparatus 24. A printer that is configured to output a document on which the information is printed is one example of the output apparatus 24.

(1-4) Configuration of Data Accumulation Apparatus 3

Figure 4:
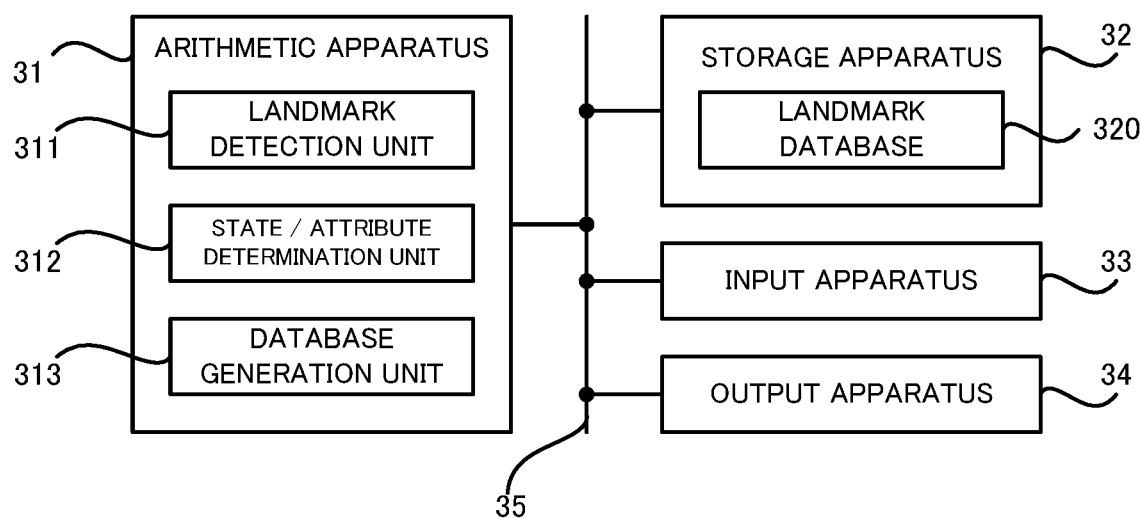
FIG. 4 is a block diagram that illustrates a configuration of an image processing apparatus in the first example embodiment.

Next, with reference to FIG. 4, a configuration of the data accumulation apparatus 3 in the first example embodiment will be described. FIG. 4 is a block diagram that illustrates the configuration of the data accumulation apparatus 3 in the first example embodiment.

As illustrated in FIG. 4, the data accumulation apparatus 3 is provided with an arithmetic apparatus 31 and a storage apparatus 32. Furthermore, the data accumulation apparatus 3 may be provided with an input apparatus 33 and an output apparatus 34. However, the data accumulation apparatus 3 may not be provided with at least one of the input apparatus 33 and the output apparatus 34. The arithmetic apparatus 31, the storage apparatus 32, the input apparatus 33 and the output apparatus 34 may be interconnected through a data bus 35.

The arithmetic apparatus 31 includes at least one of the CPU, the GPU and the FPGA, for example. The arithmetic apparatus 31 reads a computer program. For example, the arithmetic apparatus 31 may read a computer program that is stored in the storage apparatus 32. For example, the arithmetic apparatus 31 may read a computer program that is stored in a non-transitory computer-readable recording medium by using a non-illustrated recording medium reading apparatus. The arithmetic apparatus 31 may obtain (namely, download or read) a computer program from a non-illustrated apparatus that is disposed outside the data accumulation apparatus 3 through the input apparatus 33 that is configured to serve as a reception apparatus. The arithmetic apparatus 31 executes the read computer program. As a result, a logical functional block for performing an operation (for example, the data accumulation operation) that should be performed by the data accumulation apparatus 3 is implemented in the arithmetic apparatus 31. Namely, the arithmetic apparatus 31 is configured to serve as a controller for implementing the logical functional block for performing the operation that should be performed by the data accumulation apparatus 3.

FIG. 4 illustrates one example of the logical functional block that is implemented in the arithmetic apparatus for performing the data accumulation operation. As illustrated in FIG. 4, in the arithmetic apparatus 31, a landmark detection unit 311, a state/attribute determination unit 312 and a database generation unit 313 are implemented as the logical functional block that is implemented in the arithmetic apparatus for performing the data accumulation operation. Note that a detail of an operation of each of the landmark detection unit 311, the state/attribute determination unit 312 and the database generation unit 313 will be described later in detail, however, a summary thereof will be described briefly here. The landmark detection unit 311 detect the landmark of the face of the human 300 included in the face image 301 based on the face image 301. Note that the face image 101 that is used by the above described image processing apparatus 1 may be used as the face image 301. An image that is different from the face image 101 that is used by the above described image processing apparatus 1 may be used as the face image 301. Thus, the human 300 that is included in the face image 301 may be same as or may be different from the human 100 that is included in the face image 101. The state/condition determination unit 312 determines a type of the action unit that occurs on the face of the human 300 included in the face image 301. The database generation unit 313 generates the landmark database 320 that stores (namely, accumulates or includes) the landmark detected by the landmark detection unit 311 in a state where it is associated with an information indicating the type of the action unit determined by the state/attribute determination unit 312 and it is categorized by the facial parts. Namely, the database generation unit 313 generates the landmark database 320 that includes a plurality of landmarks with each of which the information indicating the type of the action unit occurring on the face of the human 300 is associated and which are categorized by a unit of each of the plurality of facial parts.

The storage apparatus 32 is configured to store a desired data. For example, the storage apparatus 32 may temporarily store the computer program that is executed by the arithmetic apparatus 31. The storage apparatus 32 may temporarily store a data that is temporarily used by the arithmetic apparatus 31 when the arithmetic apparatus 31 executes the computer program. The storage apparatus 32 may store a data that is stored for a long term by the data accumulation apparatus 3. Note that the storage apparatus 32 may include at least one of the RAM, the ROM, the hard disk apparatus, the magneto-optical disc, the SSD and the disk array apparatus. Namely, the storage apparatus 32 may include a non-transitory recording medium.

The input apparatus 33 is an apparatus that receives an input of an information from an outside of the data accumulation apparatus 3 to the data accumulation apparatus 3. For example, the input apparatus 33 may include an operational apparatus (for example, at least one of a keyboard, a mouse and a touch panel) that is operable by a user of the data accumulation apparatus 3. For example, the input apparatus 33 may include a reading apparatus that is configured to read an information recorded as a data in a recording medium that is attachable to the data accumulation apparatus 3. For example, the input apparatus 33 may include a reception apparatus that is configured to receive an information that is transmitted as a data from an outside of the data accumulation apparatus 3 to the data accumulation apparatus 3 through a communication network.

The output apparatus 34 is an apparatus that outputs an information to an outside of the data accumulation apparatus 3. For example, the output apparatus 34 may output an information relating to the data accumulation operation performed by the data accumulation apparatus 3. For example, the output apparatus 34 may output to the data generation apparatus 2 the landmark database 320 (alternatively, at least a part thereof) generated by the data accumulation operation. A transmission apparatus that is configured to transmit the information as a data through the communication network or the data bus is one example of the output apparatus 34. A display that is configured to output (namely, that is configured to display) the information as an image is one example of the output apparatus 34. A speaker that is configured to output the information as a sound is one example of the output apparatus 34. A printer that is configured to output a document on which the information is printed is one example of the output apparatus 34.

(2) Flow of Operation of Information Processing System SYS

Next, the operation of the information processing system SYS will be described. As described above, the image processing apparatus 1, the data generation apparatus 2 and the data accumulation apparatus 3 perform the action detection operation, the data generation operation and the data accumulation operation, respectively. Thus, in the below described description, the action detection operation, the data generation operation and the data accumulation operation will be described in sequence. However, for convenience of description, the data accumulation operation will be firstly described, then the data generation operation will be described and then the action detection operation will be finally described.

(2-1) Flow of Data Accumulation Operation

Figure 5:
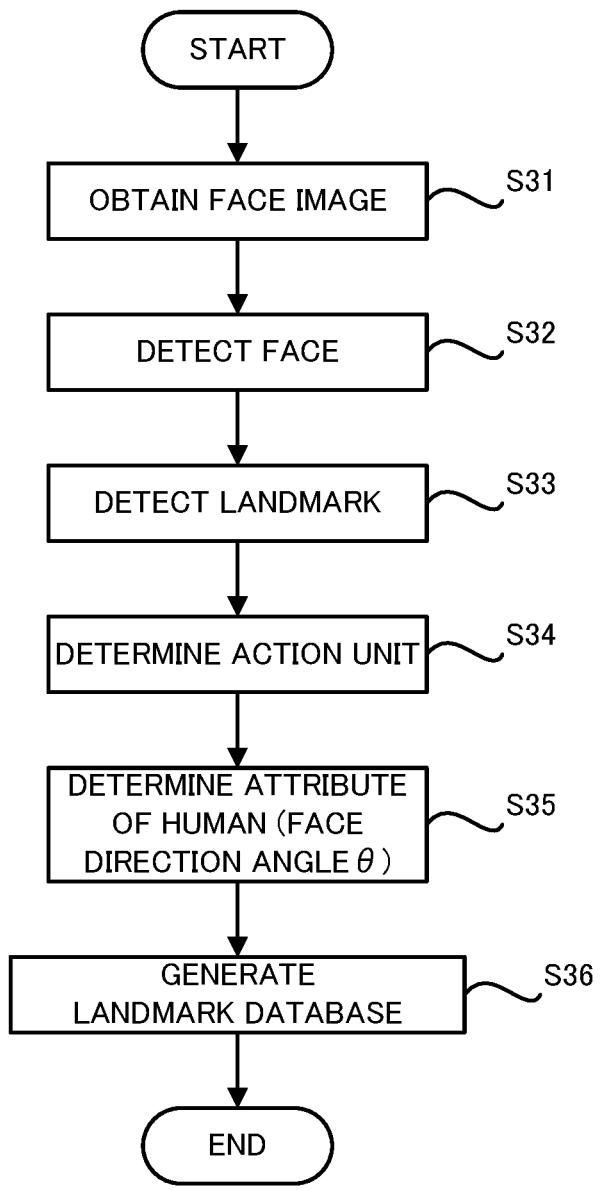
FIG. 5 is a flow chart that illustrates a flow of a data accumulation operation that is performed by the data accumulation apparatus in the first example embodiment.

Firstly, with reference to FIG. 5, the data accumulation operation that is performed by the data accumulation apparatus 3 will be described. FIG. 5 is a flowchart that illustrates a flow of the data accumulation operation that is performed by the data accumulation apparatus 3.

As illustrated in FIG. 5, the arithmetic apparatus 31 obtains the face image 301 by using the input apparatus 33 (a step S31). The arithmetic apparatus 31 may obtain single face image 301. The arithmetic apparatus 31 may obtain a plurality of face images 301. When the arithmetic apparatus 31 obtains the plurality of face images 301, the arithmetic apparatus 31 may perform an operation from a step S32 to a step S36 described below on each of the plurality of face images 301.

Figure 6:
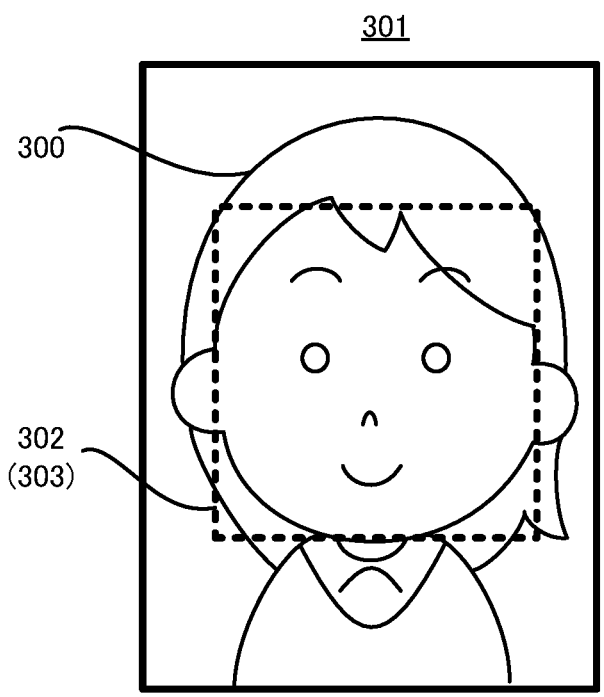
FIG. 6 is a planar view that illustrates one example of a face image.

Then, the landmark detection unit 311 detects the face of the human 300 included in the face image 301 that is obtained at the step S31 (a step S32). The landmark detection unit 311 may detect the face of the human 300 included in the face image 301 by using an existing method of detecting a face of a human included in an image. Here, one example of the method of detecting the face of the human 300 included in the face image 301 will be described. As illustrated in FIG. 6 that is a planar view illustrating one example of the face image 301, there is a possibility that the face image 301 includes not only the face of the human 300 but also a part of the human 300 other than the face and a background of the human 300. Thus, the landmark detection unit 311 determines a face region 302 in which the face of the human 300 is included from the face image 301. The face region 302 is a rectangular region, however, may be a region having another shape. The landmark detection unit 311 may extract, as new face image 303, an image part of the face image 301 that is included in the determined face region 302.

Figure 7:
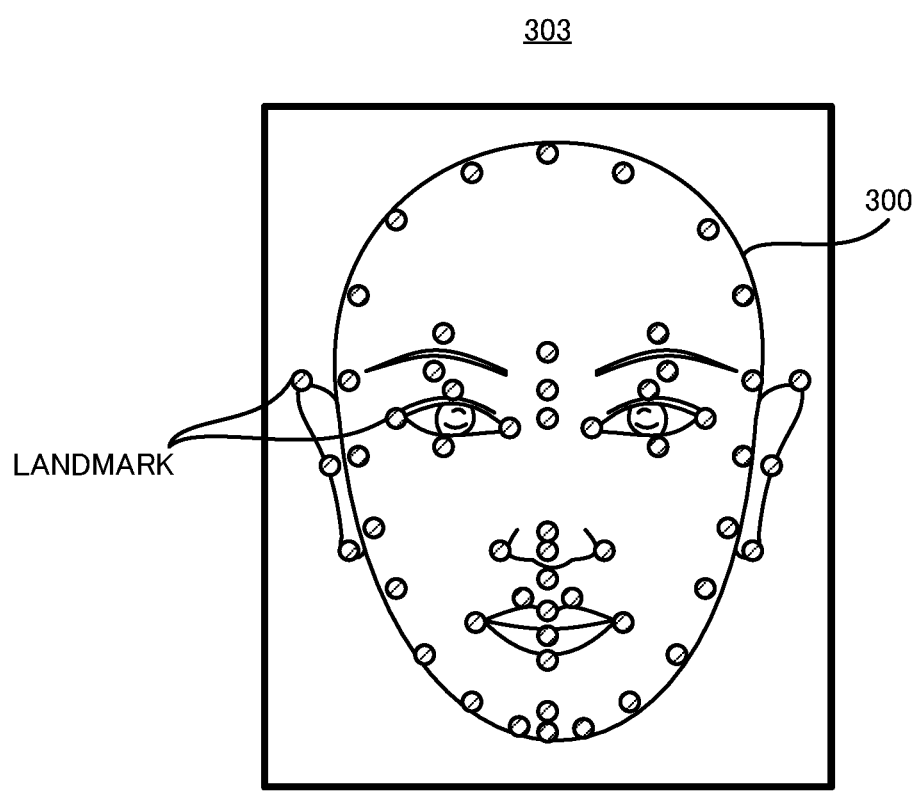
FIG. 7 is a planar view that illustrates one example of a plurality of landmarks that are detected on the face image.

Then, the landmark detection unit 311 detects a plurality of landmarks of the face of the human 300 based on the face image 303 (alternatively, the face image 301 in which the face region 302 is determined) (a step S33). For example, as illustrated in FIG. 7 that is a planar view illustrating one example of the plurality of landmarks detected on the face image 303, the landmark detection unit 311 detects, as the landmark, a characterized part of the face of the human 300 included in the face image 303. In an example illustrated in FIG. 7, the landmark detection unit 311 detects, as the plurality of landmarks, at least a part of an outline of the face, an eye, a brow, a glabella, an ear, a nose, a mouth and a jaw of the human 300. The landmark detection unit 311 may detect single landmark for each facial part or may detect a plurality of landmarks for each facial part. For example, the landmark detection unit 311 may detect single landmark relating to the eye or may detect a plurality of landmarks relating to the eye. Note that FIG. 7 (furthermore, a drawing described below) omits a hair of the human 300 for simplification of drawing.

After, before or in parallel with the operation from the step S32 to the step S33, the state/attribute determination unit 312 determines the type of the action unit occurring on the face of the human 300 included in the face image 301 that is obtained at the step S31 (a step S34). Specifically, as described above, the face image 301 is such an image that the existence and the type of the action unit occurring in the face of the human 300 included in the face image 301 is already known to the data accumulation apparatus 3. In this case, an action information that indicates the existence and the type of the action unit occurring in the face of the human 300 included in the face image 301 may be associated with the face image 301. Namely, at the step S31, the arithmetic apparatus 31 may obtain action information that indicates the existence and the type of the action unit occurring in the face of the human 300 included in the face image 301 together with the face image 301. As a result, the state/attribute determination unit 312 can determine, based on the action information, the existence and the type of the action unit occurring in the face of the human 300 included in the face image 301. Namely, the state/attribute determination unit 312 can determine the existence and the type of the action unit occurring in the face of the human 300 included in the face image 301 without performing an image processing for detecting the action unit on the face image 301.

Incidentally, it can be said that the action unit is an information that indicates a state of the face of the human 300 by using the motion of the facial part. In this case, the action information that is obtained together with the face image 301 by the arithmetic apparatus 31 may be referred to as a state information, because it is the information that indicates the state of the face of the human 300 by using the motion of the facial part.

After, before or in parallel with the operation from the step S32 to the step S34, the state/attribute determination unit 312 determines an attribute of the human 300 included in the face image 301 based on the face image 301 (alternatively, the face image 303) (a step S35). The attribute determined at the step S35 may include an attribute that has such a first property that a variation of the attribute results in a variation of a position (namely, a position in the face image 301) of at least one of the plurality of facial parts that constitute the face included in the face image 301. The attribute determined at the step S35 may include an attribute that has such a second property that the variation of the attribute results in a variation of a shape (namely, a shape in the face image 301) of at least one of the plurality of facial parts that constitute the face included in the face image 301. The attribute determined at the step S35 may include an attribute that has such a third property that the variation of the attribute results in a variation of an outline (namely, an outline in the face image 301) of at least one of the plurality of facial parts that constitute the face included in the face image 301. In this case, the data generation apparatus 2 (FIG. 1) or the arithmetic apparatus 21 (FIG. 3) can properly generate the face data 221 that indicates the landmark of the face of the virtual human 200 that provides little or no feeling of strangeness as the face of the human, because an influence of at least one of the position, the shape and the outline of the facial part on the feeling of the strangeness of the face is relatively large.

For example, there is a possibility that the position of the facial part included in the face image 301 that is obtained by capturing the image of the face of the human 300 that faces a first direction is different from the position of the facial part included in the face image 301 that is obtained by capturing the image of the face of the human 300 that faces a second direction different from the first direction. Specifically, there is a possibility that the position of the eye of the human 300 that faces frontward in the face image 301 is different from the position of the eye of the human 300 that faces leftward or rightward in the face image 301. Similarly, there is a possibility that the shape of the facial part included in the face image 301 that is obtained by capturing the image of the face of the human 300 that faces the first direction is different from the shape of the facial part included in the face image 301 that is obtained by capturing the image of the face of the human 300 that faces the second direction. Specifically, there is a possibility that the shape of the nose of the human 300 that faces frontward in the face image 301 is different from the shape of the nose of the human 300 that faces leftward or rightward in the face image 301. Similarly, there is a possibility that the outline of the facial part included in the face image 301 that is obtained by capturing the image of the face of the human 300 that faces the first direction is different from the outline of the facial part included in the face image 301 that is obtained by capturing the image of the face of the human 300 that faces the second direction. Specifically, there is a possibility that the outline of the mouth of the human 300 that faces frontward in the face image 301 is different from the outline of the mouth of the human 300 that faces leftward or rightward in the face image 301. Thus, a direction of the face is one example of the attribute that has at least one of the first to third properties. In this case, the state/attribute determination unit 312 may determine the direction of the face of the human 300 included in the face image 301 based on the face image 301. Namely, the state/attribute determination unit 312 may determine the direction of the face of the human 300 included in the face image 301 by analyzing the face image 301.

The state/attribute determination unit 312 may determine (namely, calculate) a parameter (hereinafter, it is referred to as a "face direction angle θ") that indicates the direction of the face by an angle. The face direction angle θ may mean an angle between a reference axis that extends from the face toward a predetermined direction and a comparison axis along a direction that the face actually faces. Next, with reference to FIG. 8 to FIG. 12, the face direction angle θ will be described. Incidentally, in FIG. 8 to FIG. 12, the face direction angle θ will be described by using a coordinate system in which a lateral direction in the face direction image 301 (namely, a horizontal direction) is a X axis direction and a longitudinal direction in the face direction image 301 (namely, a vertical direction) is a Y axis direction.

Figure 8:
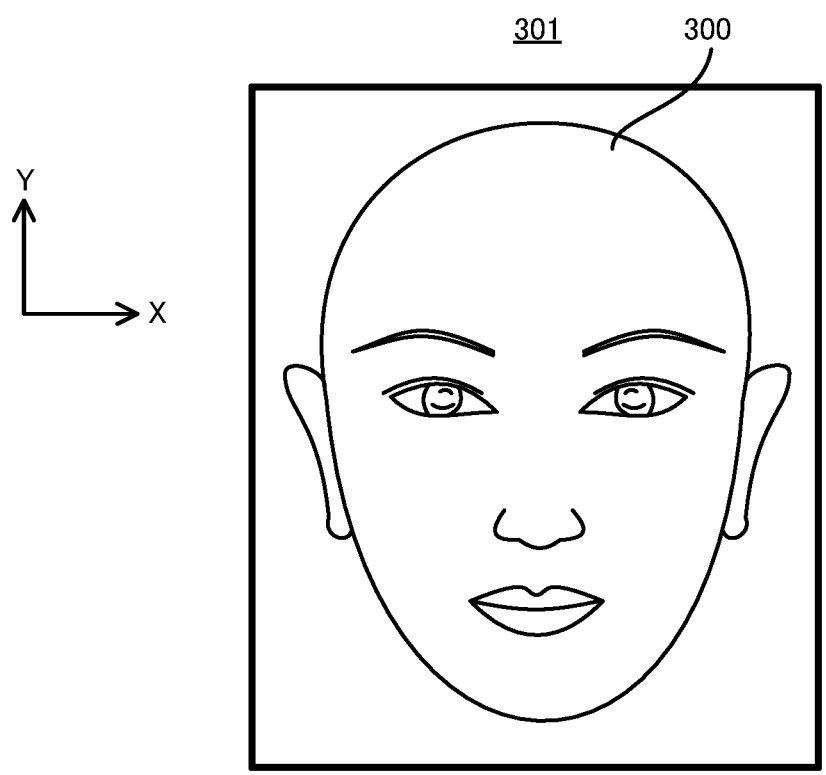
FIG. 8 is a planar view that illustrates the face image in which the human facing frontward in the face image is included.

FIG. 8 is a planar view that illustrates the face image 301 in which the human 300 facing frontward in the face image 301 is included. The face direction angle θ may be a parameter that becomes zero when the human 300 faces frontward in the face image 301. Therefore, the reference axis may be an axis along a direction that the human 300 faces when the human 300 faces frontward in the face image 301. Typically, a state where the human 300 faces frontward in the face image 301 may mean a state where the human 300 squarely faces the camera that captures the image of the human 300, because the face image 301 is generated by means of the camera capturing the image of the human 300. In this case, an optical axis (alternatively, an axis that is parallel to the optical axis) of an optical system (for example, a lens) of the camera that captures the image of the human 300 may be used as the reference axis.

Figure 9:
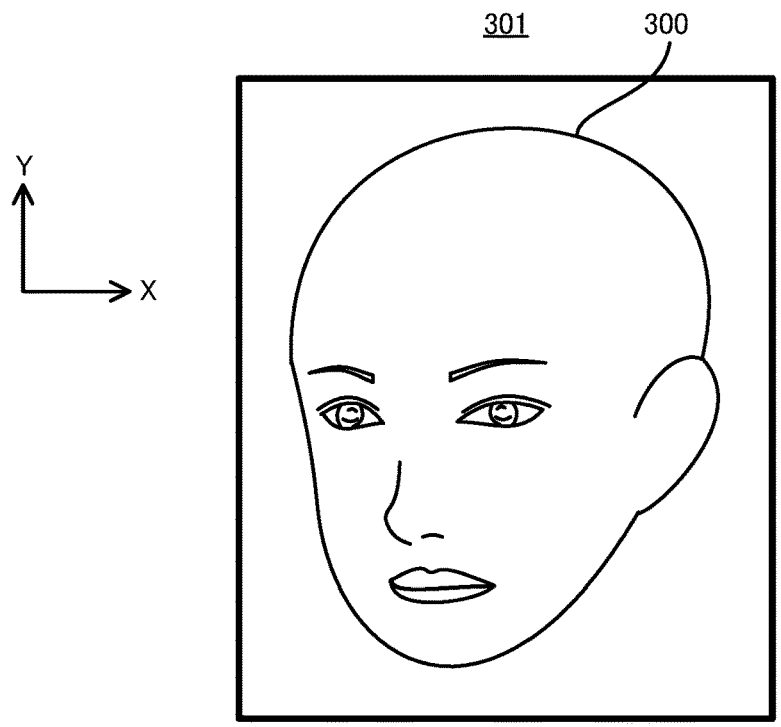
FIG. 9 is a planar view that illustrates the face image in which the human facing leftward or rightward in the face image is included.
Figure 10:
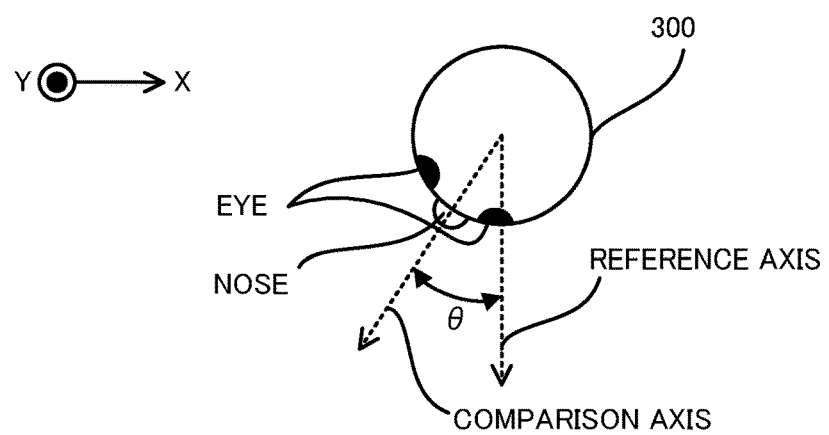
FIG. 10 is a planar view that illustrates a direction of a face of the human in a horizontal plane.

FIG. 9 is a planar view that illustrates the face image 301 in which the human 300 facing rightward in the face image 301 is included. Namely, FIG. 9 is a planar view that illustrates the face image 301 in which the human 300 rotates the face around an axis along the vertical direction (the Y axis direction in FIG. 9) (namely, moves the face along a pan direction) is included. In this case, as illustrated in FIG. 10 that is a planar view illustrating the direction of the face of the human 300 in a horizontal plane (namely, a plane that is perpendicular to the Y axis), the reference axis intersects with the comparison axis at an angle that is different from zero degree in the horizontal plane. Namely, the face direction angle θ in the pan direction (more specifically, a rotational angle of the face around the axis along the vertical direction) is an angle that is different from zero degree.

Figure 11:
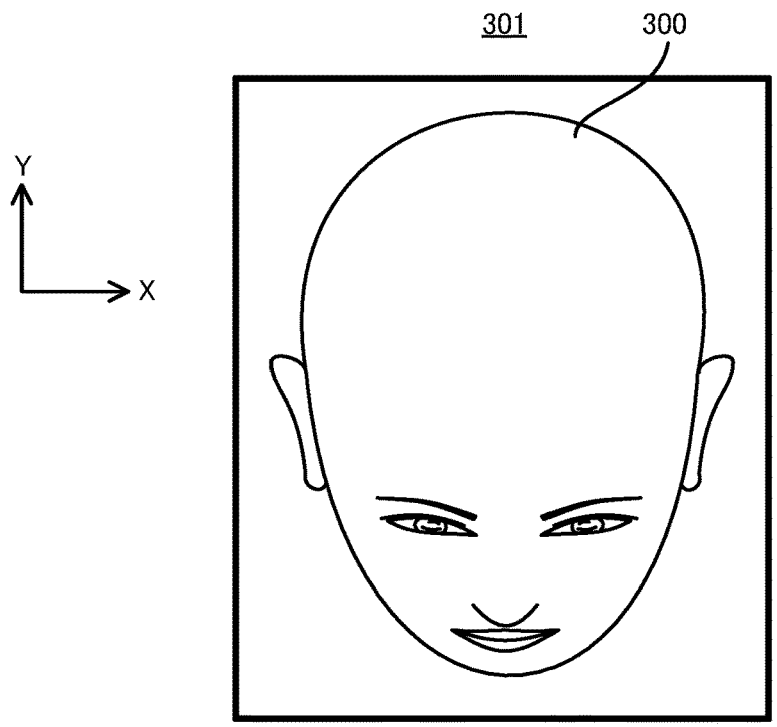
FIG. 11 is a planar view that illustrates the face image in which the human facing upward or downward in the face image is included.
Figure 12:
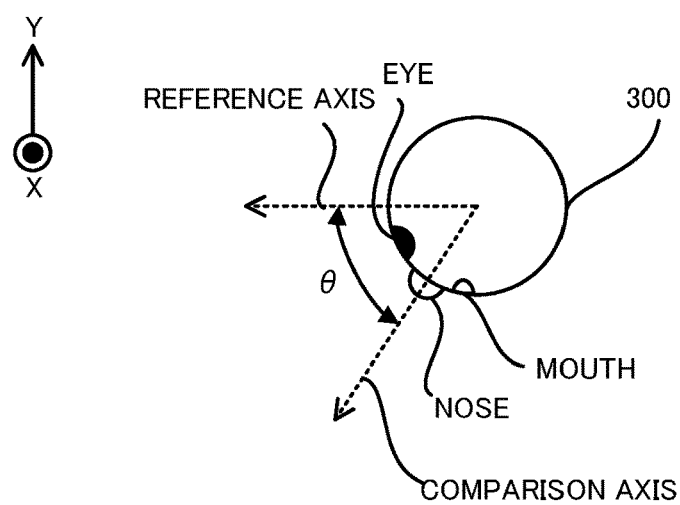
FIG. 12 is a planar view that illustrates a direction of the face of the human in a vertical plane.

FIG. 11 is a planar view that illustrates the face image 301 in which the human 300 facing downward in the face image 301 is included. Namely, FIG. 11 is a planar view that illustrates the face image 301 in which the human 300 rotates the face around an axis along the horizontal direction (the X axis direction in FIG. 11) (namely, moves the face along a tilt direction) is included. In this case, as illustrated in FIG. 12 that is a planar view illustrating the direction of the face of the human 300 in a vertical plane (namely, a plane that is perpendicular to the X axis), the reference axis intersects with the comparison axis at an angle that is different from zero degree in the vertical plane. Namely, the face direction angle θ in the tilt direction (more specifically, a rotational angle of the face around the axis along the horizontal direction) is an angle that is different from zero degree.

The state/attribute determination unit 312 may determine the face direction angle θ in the pan direction (hereinafter, it is referred to as a "face direction angle θ_pan") and the face direction angle θ in the tilt direction (hereinafter, it is referred to as a "face direction angle θ_tilt") separately, because there is a possibility that the face faces upward, downward, leftward or rightward in this manner. However, the state/attribute determination unit 312 may determine either one of the face direction angles θ_pan and θ_tilt and may not determine the other one of the face direction angles θ_pan and θ_tilt. The state/attribute determination unit 312 may determine the angle between the reference axis and the comparison axis as the face direction angles θ without distinguishing the face direction angles θ_pan and θ_tilt. Note that the face direction angle θ means both or either one of the face direction angles θ_pan and θ_tilt in the below described description, if there is no notation.

Alternatively, the state/attribute determination unit 312 may determine another attribute of the human 300 in addition to or instead of the direction of the face of the human 300 included in the face image 301. For example, there is a possibility that at least one of the position, the shape and the outline of the facial part included in the face image 301 that is obtained by capturing the image of the face of the human 300 an aspect ratio (for example, an aspect length-to-width ratio) of which is a first ratio is different from at least one of the position, the shape and the outline of the facial part included in the face image 301 that is obtained by capturing the image of the face of the human 300 an aspect ratio of which is a second ratio that is different from the first ratio. For example, there is a possibility that at least one of the position, the shape and the outline of the facial part included in the face image 301 that is obtained by capturing the image of the face of the human 300 who is a male is different from at least one of the position, the shape and the outline of the facial part included in the face image 301 that is obtained by capturing the image of the face of the human 300 who is a female. For example, there is a possibility that at least one of the position, the shape and the outline of the facial part included in the face image 301 that is obtained by capturing the image of the face of the human 300 who is a first type of race is different from at least one of the position, the shape and the outline of the facial part included in the face image 301 that is obtained by capturing the image of the face of the human 300 who is a second type of race that is different from the first type of race. This is because there is a possibility that a skeleton (eventually, a facial expression) is largely different depending on the race. Thus, at least one of the aspect ratio of the face, the sex and the race is another example of the attribute that has at least one of the first to third properties. In this case, the state/attribute determination unit 312 may determine at least one of the aspect ratio of the face of the human 300 included in the face image 301, the sex of the human 300 included in the face image 301 and the race of the human 300 included in the face image 301 based on the face image 301. In this case, the data generation apparatus 2 or the arithmetic apparatus 21 can properly generate the face data 221 that indicates the landmark of the face of the virtual human 200 that provides little or no feeling of strangeness as the face of the human by using at least one of the face direction angle θ, the aspect ratio of the face, the sex and the race as the attribute, because an influence of at least one of the face direction angle θ, the aspect ratio of the face, the sex and the race on at least one of the position, the shape and the outline of each part on the feeling of the strangeness of the face is relatively large. Incidentally, in the below described description, an example in which the state/attribute determination unit 312 determines the face direction angle θ as the attribute will be described for convenience of description.

Again in FIG. 5, then, the database generation unit 313 generates the landmark database 320 based on the landmarks detected at the step S33, the type of the action unit determined at the step S34 and the face direction angle θ (namely, the attribute of the human 300) determined at the step S35 (a step S36). Specifically, the database generation 313 generates the landmark database 320 that includes a data record 321 in which the landmark detected at the step S33, the type of the action unit determined at the step S34 and the face direction angle θ (namely, the attribute of the human 300) determined at the step S35 are associated.

In order to generate the landmark database 320, the database generation unit 313 generates the data records 321 the number of which is equal to the number of types of the facial parts that correspond to the landmarks detected at the step S33. For example, when the landmark relating to the eye, the landmark relating to the brow and the landmark of the nose are detected at the step S33, the database generation unit 313 generates the data record 321 including the landmark relating to the eye, the data record 321 including the landmark relating to the brow and the data record 321 including the landmark of the nose. As a result, the database generation unit 320 generates the landmark database 320 that includes a plurality of data records 321 with each of which the face direction angle θ is associated and which are categorized by a unit of each of the plurality of facial parts.

When there is a plurality of same types of facial parts, the database generation unit 313 may generate the data record 321 that collectively includes the landmarks of the plurality of same types of facial parts. Alternatively, the database generation unit 313 may generate a plurality of data records 321 that include the landmarks of the plurality of same types of facial parts, respectively. For example, the face includes a right eye and a left eye that are the facial parts the types of which are the same "eye". In this case, the database generation unit 313 may generate the data record 321 including the landmark relating to the right eye and the data record 321 including the landmark relating to the left eye separately. Alternatively, the database generation unit 313 may generate the data record 321 that collectively includes the landmark relating to the right eye and the left eye.

FIG. 13 illustrates one example of the data structure of the landmark database 320. As illustrated in FIG. 13, the landmark database 320 includes the plurality of data records 321. Each data record 321 includes a data field 3210 that indicates an identification number (ID) of each data record 321, a landmark data field 3211, an attribute data field 3212 and an action unit data field 3213. The landmark data field 3211 is a data field for storing, as a data, an information relating to the landmark detected at the step S33 in FIG. 5. In an example illustrated in FIG. 13, a position information that indicates a position of the landmark relating to one facial part and a part information that indicates the type of the one facial part are stored as the data in the landmark data field 3211, for example. The attribute data field 3212 is a data field for storing, as a data, an information relating to the attribute (the face direction angle θ in this case). In the example illustrated in FIG. 13, an information that indicates the face direction angle θ_pan in the pan direction and an information that indicates the face direction angle θ_tilt in the tilt direction are stored as the data in the attribute data field 3212, for example. The action unit data field 3213 is a data field for storing, as a data, an information relating to the action unit. In the example illustrated in FIG. 13, an information that indicates whether or not a first type of action unit AU #1 occurs, an information that indicates whether or not a second type of action unit AU #2 occurs, . . . , and an information that indicates whether or not a k-th (note that k is an integer that is equal to or larger than 1) type of action unit AU #k occurs are stored as the data in the action unit data field 3213, for example.

Each data record 321 includes the information (for example, the position information) relating to the landmark of the facial part the type of which is indicated by the part information and which is detected from the face that faces the direction indicated by the attribute data field 3212 and on which the action unit the type of which is indicated by the action unit data field 3213 occurs. For example, the data record 321 the identification number of which is #1 includes the information (for example, the position information) relating to the landmark of the brow which is detected from the face the face direction angle θ_pan of which is 5 degree, the face direction angle θ_tilt of which is 15 degree and on which the first type of action unit AU #1 occurs.

The position of the landmark that is stored in the landmark data field 3211 may be normalized by a size of the face of the human 300. For example, the database generation unit 320 may normalize the position of the landmark detected at the step S33 in FIG. 5 by the size (for example, an area size, a length or a width) of the face of the human 300 and generate the data record 321 including the normalized position. In this case, there is a lower possibility that the position of the landmark stored in the landmark data field 3211 varies depending on the variation of the size of the face of the human 300. As a result, the landmark database 320 can store the landmark in which the variation (namely, an individual variation) due to the size of the face of the human 300 is reduced or eliminated.

The generated landmark database 320 may be stored in the storage apparatus 32, for example. When the storage apparatus 32 already stores the landmark database 320, the database generation unit 313 may add new data record 321 to the landmark database 320 stored in the storage apparatus 32. An operation of adding the data record 321 to the landmark database 320 is equivalent to an operation of regenerating the landmark database 320.

The data accumulation apparatus 3 may repeat the data accumulation operation illustrated in FIG. 5 on the plurality of different face images 301. The plurality of different face images 301 may include a plurality of face images 301 in which a plurality of different humans 300 are included, respectively. The plurality of different face images 301 may include a plurality of face images 301 in which same human 300 are included. As a result, the data accumulation apparatus 3 can generate the landmark database 320 including the plurality of data records 321 that are collected from the plurality of different face images 301.

(2-2) Flow of Data Generation Operation

Next, the data generation operation that is performed by the data generation apparatus 2 will be described. As described above, the data generation apparatus 2 generates the face data 221 that indicates the landmark of the face of the virtual human 200 by performing the data generation operation. Specifically, as described above, the data generation apparatus 2 selects at least one landmark for each of the plurality of facial parts from the landmark database 320. Namely, the data generation apparatus 2 selects the plurality of landmarks that correspond to the plurality of facial parts, respectively, from the landmark database 320. Then, the data generation apparatus 2 generates the face data 221 by combining the plurality of selected landmarks.

In the first example embodiment, when the plurality of landmarks that correspond to the plurality of facial parts, respectively, are selected, the data generation apparatus 2 may extract the data record 321 that satisfies a desired condition from the landmark database 320, and select the landmark included in the extracted data record 321 as the landmark for generating the face data 221.

For example, the data generation apparatus 2 may use a condition relating to the action unit as one example of the desired condition. For example, the data generation apparatus 2 may extract the data record 321 in which data field 3213 indicates that a desired type of action unit occurs. In this case, the data generation apparatus 2 selects the landmark that is collected from the face image 301 that includes the face on which desired type of action unit occurs. Namely, the data generation apparatus 2 selects the landmark that is associated with the information indicating that that the desired type of action unit occurs.

For example, the data generation apparatus 2 may use a condition relating to the attribute (the face direction angle θ in this case) as one example of the desired condition. For example, the data generation apparatus 2 may extract the data record 321 in which the attribute data field 3212 indicates that the attribute is a desired attribute (for example, the face direction angle θ is a desired angle). In this case, the data generation apparatus 2 selects the landmark that is collected from the face image 301 in which the face having the desired attribute is included. Namely, the data generation apparatus 2 selects the landmark that is associated with the information indicating that that the attribute is the desired attribute (for example, the face direction angle θ is the desired angle).

Figure 14:
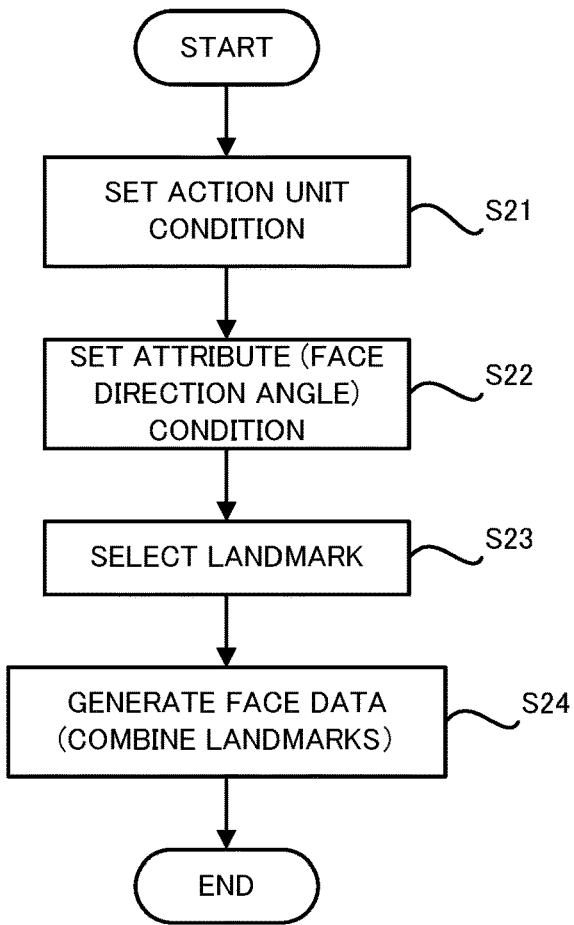
FIG. 14 is a flow chart that illustrates a flow of a data generation operation that is performed by the data generation apparatus in the first example embodiment.

Next, a flow of the data generation operation will be described with reference to FIG. 14. FIG. 14 is a flowchart that illustrates the flow of the data generation operation that is performed by the data generation apparatus 2.

As illustrated in FIG. 14, the landmark selection unit 211 may set the condition relating to the action unit as the condition for selecting the landmark (a step S21). Namely, the landmark selection unit 211 may set, as the condition relating to the action unit, the type of the action unit corresponding to the landmark that should be selected. In this case, the landmark selection unit 211 may set single condition relating to the action unit or may set a plurality of conditions relating to the action unit. Namely, the landmark selection unit 211 may set single type of the action unit corresponding to the landmark that should be selected or may set a plurality of types of the action unit corresponding to the landmark that should be selected. However, the landmark selection unit 211 may not set the condition relating to the action unit. Namely, the data generation apparatus 2 may not perform the operation at the step S21.

After, before or in parallel with the operation at the step S21, the landmark selection unit 211 may set the condition relating to the attribute (the face direction angle θ in this case) as the condition for selecting the landmark in addition to or instead of the condition relating to the action unit (a step S22). Namely, the landmark selection unit 211 may set, as the condition relating to the face direction angle θ, the face direction angle θ corresponding to the landmark that should be selected. For example, the landmark selection unit 211 may set a range of the face direction angle θ corresponding to the landmark that should be selected. In this case, the landmark selection unit 211 may set single condition relating to the face direction angle θ or may set a plurality of conditions relating to the face direction angle θ. Namely, the landmark selection unit 211 may set single face direction angle θ corresponding to the landmark that should be selected or may set a plurality of face direction angles θ corresponding to the landmark that should be selected. However, the landmark selection unit 211 may not set the condition relating to the attribute. Namely, the data generation apparatus 2 may not perform the operation at the step S22.

The landmark selection unit 21 may set the condition relating to the action unit based on an instruction of a user of the data generation apparatus 2. For example, the landmark selection unit 21 may obtain the instruction of the user for setting the condition relating to the action unit through the input apparatus 23 and set the condition relating to the action unit based on the obtained instruction of the user.

Alternatively, the landmark selection unit 21 may set the condition relating to the action unit randomly. When the image processing apparatus 1 detects at least one of the plurality of types of action units as described above, the landmark selection unit 211 may set the condition relating to the action unit so that the plurality of type of action units that are detection target of the image processing apparatus 1 are set in sequence as an action unit corresponding to the landmark that should be selected by the data generation apparatus 2. The same applies to the condition relating to the attribute.

Then, the landmark selection unit 211 randomly select at least one landmark for each of the plurality of facial parts from the landmark database 320 (a step S23). Namely, the landmark selection unit 211 repeats an operation for randomly selecting the data record 321 including the landmark of one facial part and selecting the landmark included in the selected data record 321 until the plurality of landmarks that correspond to the plurality of facial parts, respectively, are selected. For example, the landmark selection unit 211 may perform an operation for randomly selecting the data record 321 including the landmark of the brow and selecting the landmark included in the selected data record 321, an operation for randomly selecting the data record 321 including the landmark of the eye and selecting the landmark included in the selected data record 321, an operation for randomly selecting the data record 321 including the landmark of the nose and selecting the landmark included in the selected data record 321, an operation for randomly selecting the data record 321 including the landmark of the upper lip and selecting the landmark included in the selected data record 321, an operation for randomly selecting the data record 321 including the landmark of the lower lip and selecting the landmark included in the selected data record 321 and an operation for randomly selecting the data record 321 including the landmark of the cheek and selecting the landmark included in the selected data record 321.

When the landmark of one facial part is randomly selected, the landmark selection unit 211 refers to at least one of the condition relating to the action unit that is set at the step S21 and the condition relating to the attribute that is set at the step S22. Namely, the landmark selection unit 211 randomly selects the landmark of one facial part that satisfies at least one of the condition relating to the action unit that is set at the step S21 and the condition relating to the attribute that is set at the step S22.

Specifically, the landmark selection unit 211 may randomly extract one data record 321 in which the action unit data field 3213 indicates that the action unit whose type is set at the step S21 occurs and select the landmark included in the extracted data record 321. Namely, the landmark selection unit 211 may select the landmark that is collected from the face image 301 that includes the face on which the action unit whose type is set at the step S21 occurs. In other words, the landmark selection unit 211 may select the landmark with which the information indicating that the action unit whose type is set at the step S21 occurs is associated.

The landmark selection unit 211 may randomly extract one data record 321 in which the attribute data field 3212 indicates that the human 300 faces a direction corresponding to the face direction angle θ that is set at the step S22 and select the landmark included in the extracted data record 321. Namely, the landmark selection unit 211 may select the landmark that is collected from the face image 301 including the face that faces the direction corresponding to the face direction angle θ set at the step S22. In other words, the landmark selection unit 211 may select the landmark with which the information indicating that the human 300 faces the direction corresponding to the face direction angle θ set at the step S22 is associated. In this case, the data generation apparatus 2 or the arithmetic apparatus 21 may not combine the landmark of one facial part of the face having one attribute with the landmark of another facial part of the face having another attribute that is different from one attribute. For example, the data generation apparatus 2 or the arithmetic apparatus 21 may not combine the landmark of the eye of the face that faces frontward with the landmark of the nose of the face that faces leftward or rightward. Thus, the data generation apparatus 2 or the arithmetic apparatus 21 can generate the face data 221 by disposing the plurality of landmarks that correspond to the plurality of facial parts, respectively, at a position that provides little or no feeling of strangeness in an arrangement manner that provides little or no feeling of strangeness. Namely, the data generation apparatus 2 or the arithmetic apparatus 21 can properly generate the face data 221 that indicates the landmark of the face of the virtual human 200 that provides little or no feeling of strangeness as the face of the human.

When the plurality of types of the action unit corresponding to the landmark that should be selected are set at the step S21, the landmark selection unit 211 may select the landmark that corresponds to at least one of the plurality of set types of action units. Namely, the landmark selection unit 211 may select the landmark that is collected from the face image 301 that includes the face on which at least one of the plurality of set types of action units occurs. In other words, the landmark selection unit 211 may select the landmark that is associated with the information indicating that at least one of the plurality of set types of action units occurs. Alternatively, the landmark selection unit 211 may select the landmark that corresponds to all of the plurality of set types of action units. Namely, the landmark selection unit 211 may select the landmark that is collected from the face image 301 that includes the face on which all of the plurality of set types of action units occur. In other words, the landmark selection unit 211 may select the landmark that is associated with the information indicating that all of the plurality of set types of action units occur.

When the plurality of face direction angles θ corresponding to the landmark that should be selected are set at the step S22, the landmark selection unit 211 may select the landmark that corresponds to at least one of the plurality of set face direction angles θ. Namely, the landmark selection unit 211 may select the landmark that is collected from the face image 301 including the face that faces a direction based on at least one of the plurality of set face direction angles θ. In other words, the landmark selection unit 211 may select the landmark that is associated with the information indicating that the face faces the direction based on at least one of the plurality of set face direction angles θ.

Then, the face data generation unit 212 generates the face data 221 by combining the plurality of landmarks that are selected at the step S23 and that correspond to the plurality of facial parts, respectively. Specifically, the face data generation unit 212 generates the face data 221 by combining the plurality of landmarks that are selected at the step S23 so that the landmark of one facial part selected at the step S23 is disposed at a position of this landmark (namely, the position that is indicated by the position information included in the data record 321). Namely, the face data generation unit 212 generates the face data 221 by combining the plurality of landmarks that are selected at the step S23 so that the landmark of one facial part selected at the step S23 constitute a part of the face of the virtual human.

Figure 15:
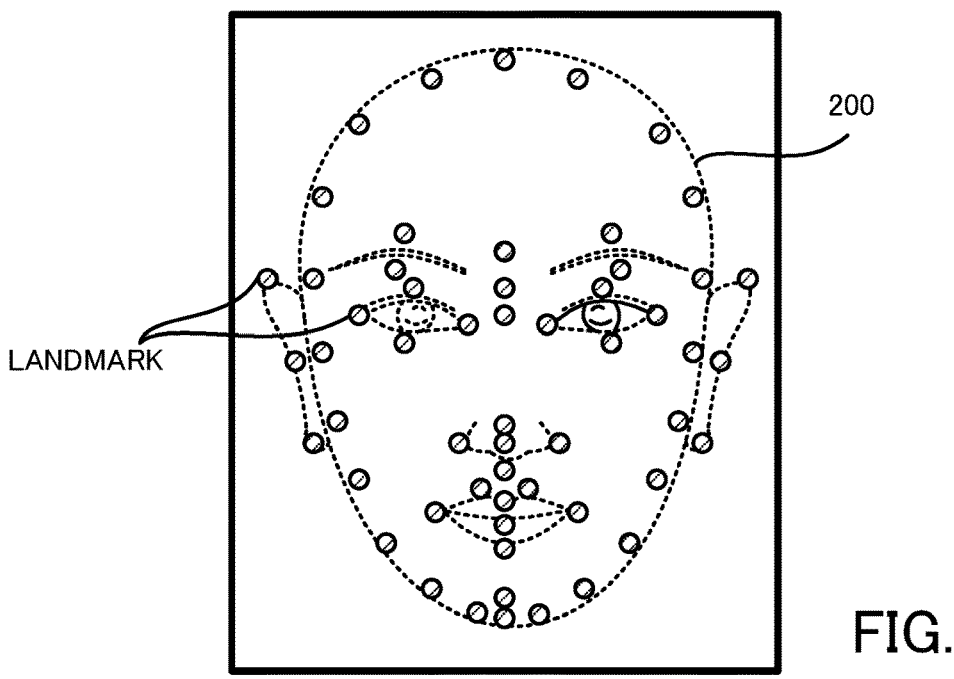
FIG. 15 is a planar view that conceptually illustrates a face data.

As a result, as illustrated in FIG. 15 that is a planar view conceptually illustrating the face data 221, the face data 221 that represents the characteristic of the face of the virtual human 200 by using the landmarks.

The generated face data 221 may be stored in the storage apparatus 22 in a state where the condition relating to the action unit (namely, the type of the action unit) that is set at the step S21 is assigned thereto as the ground truth label. The face data 221 stored in the storage apparatus 22 may be used as the learning data set 220 to perform the learning of the learning model of the image processing apparatus 1 as described above.

The data generation apparatus 2 may repeat the above described data generation operation illustrated in FIG. 14 a plurality of times. As a result, the data generation apparatus 2 can generate the plurality of face data 221. Here, the face data 221 is generated by combining the landmarks collected from the plurality of face image 301. Thus, the data generation apparatus 2 can typically generate the face data 221 the number of which is larger than the number of the face images 301.

(2-3) Flow of Action Detection Operation

Figure 16:
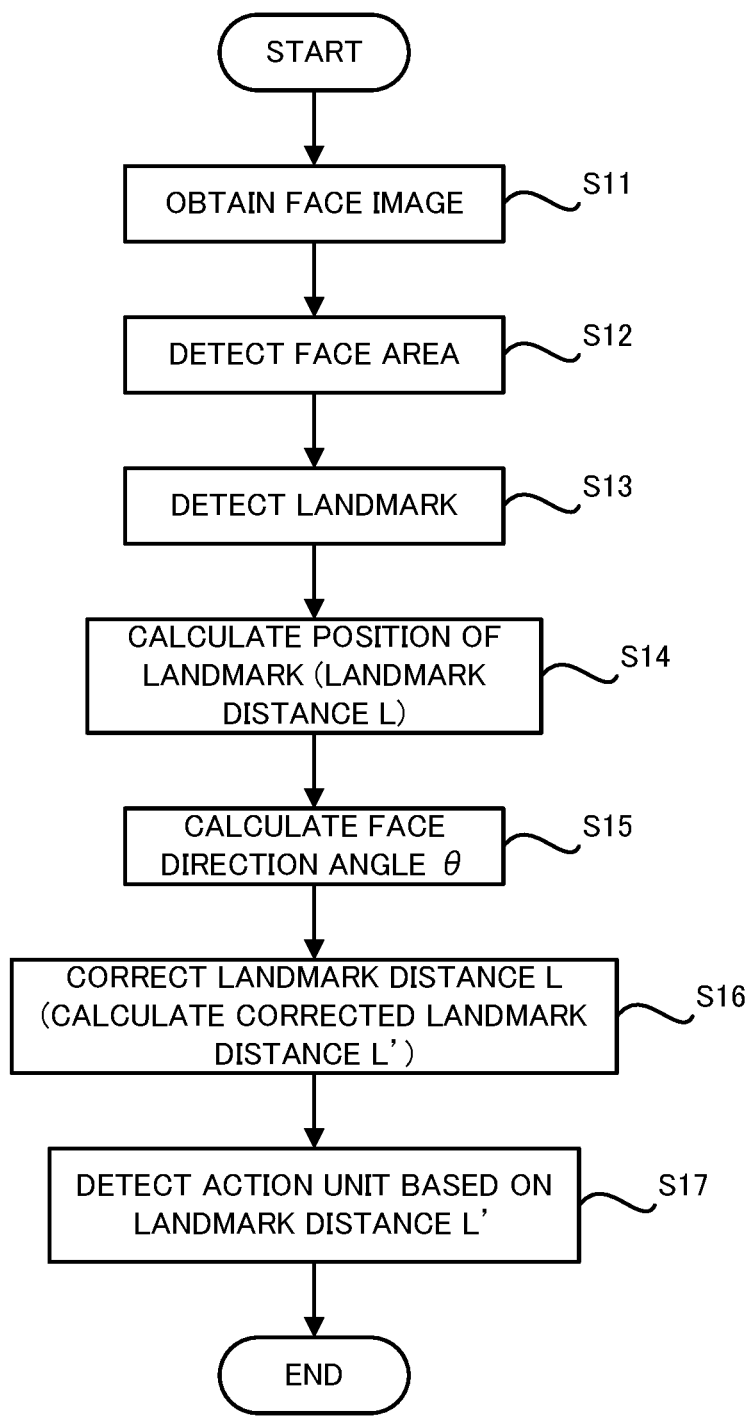
FIG. 16 is a flow chart that illustrates a flow of an action detection operation that is performed by the image processing apparatus in the first example embodiment.

Next, with reference to FIG. 16, the action detection operation that is performed by the image processing apparatus 1 will be described. FIG. 16 is a flowchart that illustrates a flow of the action detection operation that is performed by the image processing apparatus 1.

As illustrated in FIG. 16, the arithmetic apparatus 12 obtains the face image 101 from the camera 11 by using the input apparatus 14 (a step S11). The arithmetic apparatus 12 may obtain a single face image 101. The arithmetic apparatus 12 may obtain a plurality of face images 101. When the arithmetic apparatus 12 obtains the plurality of face images 101, the arithmetic apparatus 12 may perform a below described operation from a step S12 to a step S16 on each of the plurality of face images 101.

Then, the landmark detection unit 121 detects the face of the human 100 included in the face image 101 that is obtained at the step S11 (a step S12). Note that an operation of the landmark detection unit 121 for detecting the face of the human 100 in the action detection operation may be same as an operation of the landmark detection unit 311 for detecting the face of the human 300 in the above described data accumulation operation (the step S32 in FIG. 5). Thus, a detailed description of the operation of the landmark detection unit 121 for detecting the face of the human 100 is omitted.

Then, the landmark detection unit 121 detects a plurality of landmarks of the face of the human 100 based on the face image 101 (alternatively, an image part of the face image 101 that is included in a face region determined at the step S12) (a step S13). Note that an operation of the landmark detection unit 121 for detecting the landmarks of the face of the human 100 in the action detection operation may be same as an operation of the landmark detection unit 311 for detecting the landmarks of the face of the human 300 in the above described data accumulation operation (the step S33 in FIG. 5). Thus, a detailed description of the operation of the landmark detection unit 121 for detecting the landmarks of the face of the human 100 is omitted.

Then, the position correction unit 123 generates the position information relating to the position of the landmarks that are detected at the step S13 (a step S14). For example, the position correction unit 123 may calculate a relative positional relationship between the plurality of landmarks detected at the step S13 to generate the position information that indicates the relative positional relationship. For example, the position correction unit 123 may calculate a relative positional relationship between at least two any landmarks of the plurality of landmarks detected at the step S13 to generate the position information that indicates the relative positional relationship.

In the below described description, an example in which the position correction unit 123 generates a distance (hereinafter, it is referred to as a "landmark distance L") between two any landmarks of the plurality of landmarks detected at the step S13 will be described. In this case, when N landmarks are detected at the step S13, the position correction unit 123 calculates the landmark distance L between k-th (note that k is a variable number indicating an integer that is equal to or larger than 1 and that is equal to or smaller than N) landmark and m-th (note that m is a variable number indicating an integer that is equal to or larger than 1, that is equal to or smaller than N and that is different from the variable number k) landmark while changing a combination of the variable numbers k and m. Namely, the position correction unit 123 calculates a plurality of landmark distances L.

The landmark distance L may include a distance (namely, a distance in a coordinate system that indicates a position in the face image 101) between two different landmarks that are detected from same face image 101. Alternatively, when the plurality of face images 101 are inputted to the image processing apparatus 1 as a time-series data, the landmark distance L may include a distance between two landmarks that are detected from different two face images 101, respectively, and that correspond to each other. Specifically, the landmark distance L may include a distance (namely, a distance in the coordinate system that indicates the position in the face image 101) between one landmark that is detected from the face image 101 in which the face of the human 100 at a first time is included and same one landmark that is detected from the face image 101 in which the face of the human 100 at a second time different from the first time is included.

After, before or in parallel with the operation from the step S12 to the step S14, the face direction calculation unit 122 calculate the face direction angle θ of the face of the human 100 included in the face image 101 based on the face image 101 (alternatively, the image part of the face image 101 that is included in the face region determined at the step S12) (a step S15). Note that an operation of the face direction calculation unit 122 for calculating the face direction angle θ of the human 100 in the action detection operation may be same as an operation of the state/attribute determination unit 312 for calculating the face direction angle θ of the human 300 in the above described data accumulation operation (the step S35 in FIG. 5). Thus, a detailed description of the operation of the face direction calculation unit 122 for calculating the face direction angle θ of the human 100 is omitted.

Then, the position correction unit 123 corrects the position information (the plurality of feature distances L in this case) generated at the step S14 based on the face direction angle θ calculated at the step S15 (a step S16). As a result, the position correction unit 123 generates the corrected position information (in this case, calculates a plurality of corrected landmark distances in this case). Note that the landmark distance L calculated at the step S14 (namely, the landmark distance L that is not yet corrected at the step S16) is referred to as a "landmark distance L" and the landmark distance L corrected at the step S16 is referred to as a "landmark distance L" to distinguish both in the below described description.

Here, a reason why the landmark distance L is corrected based on the face direction angle θ will be described. The landmark distance L is generated to detect the action unit as described above. This is because at least one of the plurality of facial parts that constitute the face moves when the action unit occurs, and thus the landmark distance L (namely, the position information relating to the position of the landmark) varies. Thus, the image processing apparatus 1 can detect the action unit based on the variation of the landmark distance L. On the other hand, the landmark distance L may vary due to a factor that is different from the occurrence of the action unit. Specifically, the landmark distance L may vary due to a variation of the direction of the face of the human 100 included in the face image 101. In this case, there is a possibility that the image processing apparatus 1 erroneously determines that a certain type of action unit occurs on the ground of the variation of the landmark distance L due to the variation of the direction of the face of the human 100, even when the action unit does not occur. As a result, the image processing apparatus 1 cannot determine with accuracy whether or not the action unit occurs, which is a technical problem.

Thus, in the first example embodiment, the image processing apparatus 1 detects the action unit based on the landmark distance L' that is corrected based on the face direction angle θ instead of detecting the action unit based on the landmark distance L in order to solve the above described technical problem. Considering the reason why the landmark distance L is corrected based on the face direction angle θ, it is preferable that the position correction unit 123 correct the landmark distance L based on the face direction angle θ so as to reduce an influence of the variation of the landmark distance L caused by the variation of the direction of the face of the human 100 on the operation for determining whether or not the action unit occurs. In other words, it is preferable that the position correction unit 123 correct the landmark distance L based on the face direction angle θ so as to reduce an influence of the variation of the landmark distance L caused by the variation of the direction of the face of the human 100 on the detection accuracy of the action unit. Specifically, the position correction unit 123 may correct the landmark distance L based on the face direction angle θ so as to calculate the landmark distance L' in which a varied amount due to the change of the direction of the face of the human 100 is reduced or canceled (namely, that is closer to an expected distance) compared to the landmark distance L that may change from the expected distance due to the variation of the direction of the face of the human 100.

As one example, the position correction unit 123 may correct the landmark distance L by using a first equation of $L'=L/\cos\theta$. Note that the face direction angle θ in the first equation may mean the angle between the reference axis and the comparison angle in a situation where the face direction angles θ_pan and θ_tilt are not distinguished. An operation of correcting the landmark distance L by using a first equation of $L'=L/\cos\theta$ corresponds to one specific example of an operation of correcting the landmark distance L so as to reduce the influence of the variation of the landmark distance L caused by the variation of the direction of the face of the human 100 on the operation for determining whether or not the action unit occurs.

As described above, the face direction calculation unit 122 may calculate the face direction angle θ_pan in the pan direction and the face direction angle θ_tilt in the tilt direction. In this case, the position correction unit 123 may divide the landmark distance L into a distance component Lx in the X axis direction and a distance component Ly in the Y axis direction and correct each of the distance components Lx and Ly. As a result, the position correction unit 123 may calculate a distance component Lx' in the X axis direction of the landmark distance L' and a distance component Ly' in the Y axis direction of the landmark distance L'. Specifically, the position correction unit 123 may correct the distance components Lx and Ly separately by using a second equation of $Lx'=Lx/\cos\theta\_pan$ and a third equation of $Ly'=Ly/\cos\theta\_tilt$. As a result, the position correction unit 123 may calculate the landmark distance L' by using an equation of $L'=(Lx'^2+Ly'^2)^{(1/2)}$. Alternatively, the second equation of $Lx'=Lx/\cos\theta\_pan$ and the third equation of $Ly'=Ly/\cos\theta\_tilt$ may be integrated as a fourth equation of $L'=((Lx/\cos\theta\_pan)^2+(Ly/\cos\theta\_tilt)^2)^{(1/2)}$. Namely, the position correction unit 123 may calculate the landmark distance L' by correcting the landmark distance L (the distance components Lx and Ly) by using the fourth equation. Note that the fourth equation is an equation for collectively performing a calculation based on the second equation and the third equation, and thus, the fact remains that it is an equation based on the first equation of $L'=L/\cos\theta$ (namely, is substantially equivalent to the first equation), as with the second equation and the third equation.

Here, in the first example embodiment, the position correction unit 123 is allowed to correct the landmark distance L based on the face direction angle θ corresponding to a numerical parameter that indicates how much a direction that the face of the human 100 faces is away from the frontward direction. As a result, as can be seen from the above described first to fourth equations, the position correction unit 123 corrects the landmark distance L so that a corrected amount of the landmark distance L (namely, a difference between the uncorrected landmark distance L and the corrected landmark distance L') when the face direction angle θ is a first angle is different from a corrected amount of the landmark distance L when the face direction angle θ is a second angle that is different from the first angle.

Then, the action detection unit 124 determines whether or not the action unit occurs on the face of the human 100 included in the face image 101 based on the plurality of landmark distances L' (namely, the position information) corrected by the position correction unit 123 (a step S17). Specifically, the action detection unit 124 may determine whether or not the action unit occurs on the face of the human 100 included in the face image 101 by inputting the plurality of landmark distances L' corrected at the step S16 into the above described learning model. In this case, the learning model may generate a feature vector based on the plurality of landmark distances L' and output a result of the determination whether or not the action unit occurs on the face of the human 100 included in the face image 101 based on the generated feature vector. The feature vector may be a vector in which the plurality of landmark distances L' are arranged. The feature vector may be a vector that represents a characteristic of the plurality of landmark distances L'.

(3) Technical Effect of Information Processing System SYS

As described above, in the first example embodiment, the image processing apparatus 1 can determine whether or not the action unit occurs on the face of the human 100 included in the face image 101. Namely, the image processing apparatus 1 can detect the action unit that occurs on the face of the human 100 included in the face image 101.

Especially in the first example embodiment, the image processing apparatus 1 can correct the landmark distance L (namely, the position information relating to the position of the landmark of the face of the human 100) based on the face direction angle θ of the human 100 and determine whether or not the action unit occurs based on the corrected face direction angle θ. Thus, there is a lower possibility that the image processing apparatus 1 erroneously determines that a certain type of action unit occurs on the ground of the variation of the landmark distance L due to the variation of the direction of the face of the human 100, even when the action unit does not occur, compared to the case where the landmark distance L is not corrected based on the face direction angle θ. Thus, the image processing apparatus 1 can determine whether or not the action unit occurs with accuracy.

In this case, the image processing apparatus 1 can correct the face direction angle θ with considering how much the direction that the face of the human 100 faces is away from the frontward direction, because it corrects the landmark distance L by using the face direction angle θ. Thus, the image processing apparatus 1 can determine whether or not the action unit occurs with higher accuracy, compared to an image processing apparatus in a comparison example that considers only whether the face of the human 100 faces frontward, leftward or rightward (namely, that does not consider the face direction angle θ).

Moreover, the image processing apparatus 1 can correct the landmark distance L based on the face direction angle θ so as to reduce the influence of the variation of the landmark distance L caused by the variation of the direction of the face of the human 100 on the operation for determining whether or not the action unit occurs. Thus, there is a lower possibility that the image processing apparatus 1 erroneously determines that a certain type of action unit occurs on the ground of the variation of the landmark distance L due to the variation of the direction of the face of the human 100, even when the action unit does not occur, compared to the case where landmark distance L is not corrected based on the face direction angle θ. Thus, the image processing apparatus 1 can determine whether or not the action unit occurs with accuracy.

Moreover, the image processing apparatus 1 can correct the landmark distance L by using the above described first equation of $L'=L/\cos\theta$ (furthermore, at least one of the second to fourth equation based on the first equation). Thus, the image processing apparatus 1 can properly correct the landmark distance L so as to reduce the influence of the variation of the landmark distance L caused by the variation of the direction of the face of the human 100 on the operation for determining whether or not the action unit occurs.

Moreover, in the first example embodiment, the data generation apparatus 2 can generate the face data 221 by selecting the landmark that is collected from the face image 301 that includes the face on which the desired type of action unit occurs for each of the plurality of facial parts and combining the plurality of landmarks that correspond to the plurality of facial parts, respectively. Thus, the data generation apparatus 2 can properly generate the face data 221 that indicates the landmark of the face of the virtual human 200 on which the desired type of action unit occurs. As a result, the data generation apparatus 2 can properly generate the learning data set 220 including the plurality of face data 221 the number of which is larger than the number of the face image 301 and to each of which the ground truth label indicating that the desired type of the action unit occurs is assigned. Namely, the data generation apparatus 2 can properly generate the learning data set 220 including more face data 221 to which the ground truth label is assigned, compared to a case where the face image 301 is used as the learning data set 220 as it is. Namely, the data generation apparatus 2 can prepare the huge number of face data 221 that correspond to the face images to each of which the ground truth label is assigned even in a situation where it is difficult to prepare the huge number of face images 301 that correspond to the face images to each of which the ground truth label is assigned. Thus, the number of the learning data for the leaning model is larger than that in a case where the learning of the learning model of the image processing apparatus 1 is performed by using the face images 301 themselves. As a result, the learning of the learning model of the image processing apparatus 1 can be performed by using the face data 221 more properly (for example, so as to improve the detection accuracy more). As a result, the detection accuracy of the image processing apparatus 1 improves.

Moreover, in the first example embodiment, the data generation apparatus 2 can generate the face data 221 by selecting the landmark that is collected from the face image 301 that includes the face having the desired attribute for each of the plurality of facial parts and combining the plurality of landmarks that correspond to the plurality of facial parts, respectively. In this case, the data generation apparatus 2 may not combine the landmark of one facial part of the face having one attribute with the landmark of the face of another facial part having another attribute that is different from one attribute. For example, the data generation apparatus 2 may not combine the landmark of the eye of the face that faces frontward with the landmark of the nose of the face that faces leftward or rightward. Thus, the data generation apparatus 2 can generate the face data 221 by disposing the plurality of landmarks that correspond to the plurality of facial parts, respectively, at the position that provides little or no feeling of strangeness in the arrangement manner that provides little or no feeling of strangeness. Namely, the data generation apparatus 2 can properly generate the face data 221 that indicates the landmark of the face of the virtual human 200 that provides little or no feeling of strangeness as the face of the human. As a result, the learning of the learning model of the image processing apparatus 1 can be performed by using the face data 221 that indicates the landmark of the face of the virtual human 200 that is relatively closer to the face of the actual human. As a result, the learning of the learning model of the image processing apparatus 1 can be performed more properly (for example, so as to improve the detection accuracy more), compared to a case where the learning of the learning model o is performed by using the face data 221 that indicates the landmark of the face of the virtual human 200 that is different from the face of the actual human. As a result, the detection accuracy of the image processing apparatus 1 improves.

Moreover, when the position of the landmark stored in the landmark database 320 is normalized by the size of the face of the human 300 in the above described data accumulation operation, the data generation apparatus 2 can generate the face data 221 by combining the landmark in which the variation due to the size of the face of the human 300 is reduced or eliminated. As a result, the data generation apparatus 2 can properly generate the face data 221 that indicates the landmark of the face of the virtual human 200 that is constituted by the plurality of facial parts disposed to have a positional relationship that provides little or no feeling of strangeness, compared to a case where the position of the landmark stored in the landmark database 320 is not normalized by the size of the face of the human 300. In this case, the learning of the learning model of the image processing apparatus 1 can be also performed by using the face data 221 that indicates the landmark of the face of the virtual human 200 that is relatively closer to the face of the actual human.

In the first example embodiment, the attribute having the property that the variation of the attribute results in the variation of at least one of the position and the shape of at least one of the plurality of facial parts that constitute the face included in the face image 301 can be used as the attribute. In this case, the data generation apparatus 2 can properly generate the face data 221 that indicates the landmark of the face of the virtual human 200 that provides little or no feeling of strangeness as the face of the human, because the influence of at least one of the position and the shape of the facial part on the feeling of the strangeness of the face is relatively large.

In the first example embodiment, at least one of the face direction angle θ, the aspect ratio of the face, the sex and the race can be used as the attribute. In this case, the data generation apparatus 2 can properly generate the face data 221 that indicates the landmark of the face of the virtual human 200 that provides little or no feeling of strangeness as the face of the human by using at least one of the face direction angle θ, the aspect ratio of the face, the sex and the race as the attribute, because the influence of at least one of the face direction angle θ, the aspect ratio of the face, the sex and the race on at least one of the position, the shape and the outline of each part of the face is relatively large.

Moreover, in the first example embodiment, the data accumulation apparatus 3 generates the landmark database 320 that is usable by the data generation apparatus 2 to generate the face data 221. Thus, the data accumulation apparatus 3 can allow the data generation apparatus 2 to properly generate the face data 221 by providing the landmark database 320 to the data generation apparatus 2.

(4) Configuration of Information Processing System SYS in Second Example Embodiment Next, the information processing system in a second example embodiment will be described. In the below described description, the information processing system SYS in the second example embodiment is referred to as an "information processing system SYSb" to distinguish it from the information processing system SYS in the first example embodiment. A configuration of the information processing system SYSb in the second example embodiment is same as the configuration of the above described information processing system SYS in the first example embodiment. The information processing system SYSb in the second example embodiment is different from the above described information processing system SYS in the first example embodiment in that the flow of the action detection operation is different. Another feature of the information processing system SYSb in the second example embodiment may be same as another feature of the above described information processing system SYS in the first example embodiment. Thus, next, with reference to FIG. 17, it is a flowchart that illustrates the flow of the action detection operation that is performed by the information processing system SYSb in the second example embodiment.

Figure 17:
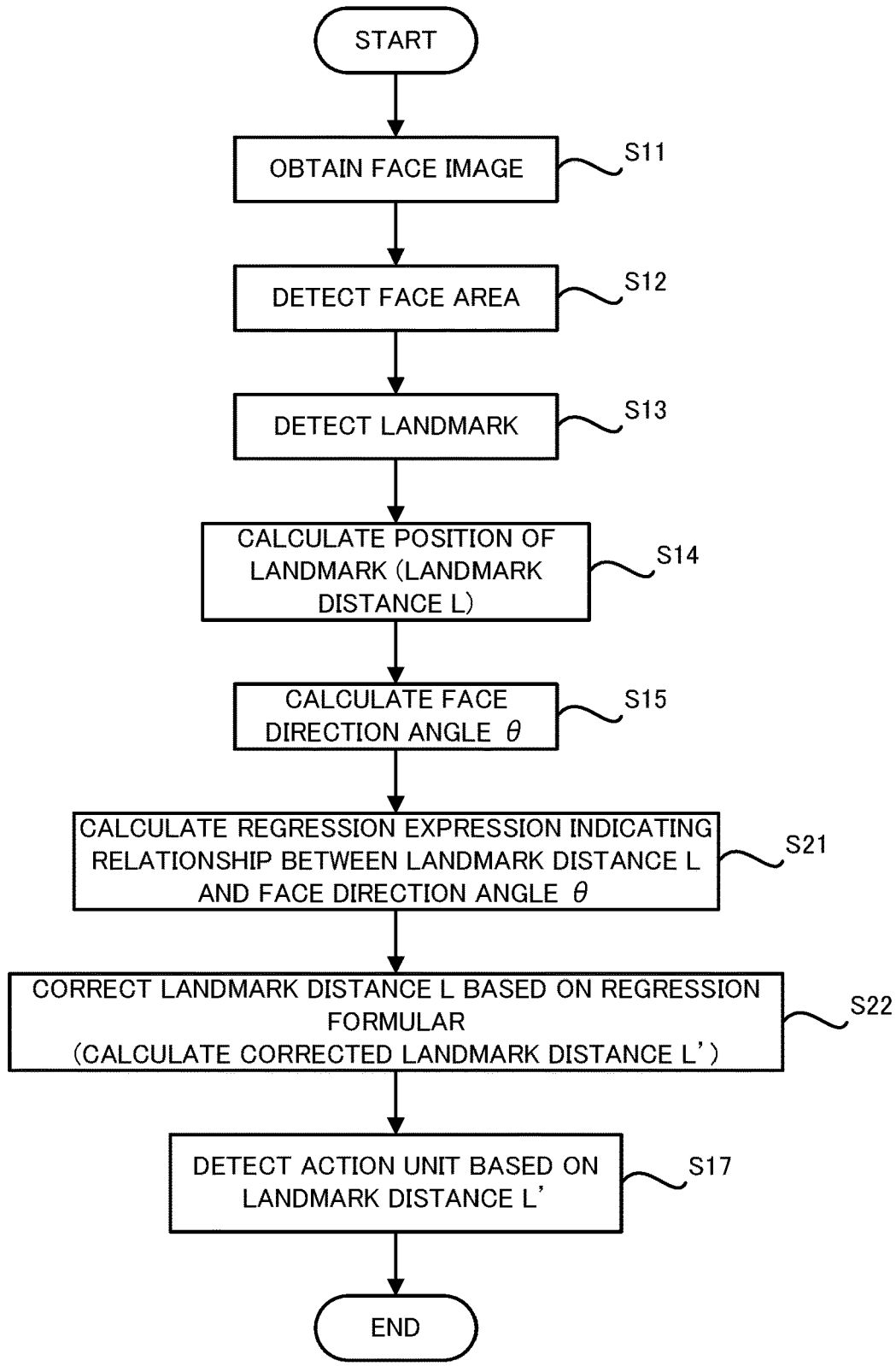
FIG. 17 is a flow chart that illustrates a flow of an action detection operation that is performed by the image processing apparatus in a second example embodiment.

As illustrated in FIG. 17, even in the second example embodiment, the arithmetic apparatus 12 obtains the face image 101 from the camera 11 by using the input apparatus 14 (the step S11), as with the first example embodiment. Then, the landmark detection unit 121 detects the face of the human 100 included in the face image 101 that is obtained at the step S11 (the step S12). Then, the landmark detection unit 121 detects the plurality of landmarks of the face of the human 100 based on the face image 101 (alternatively, the image part of the face image 101 that is included in the face region determined at the step S12) (the step S13). Then, the position correction unit 123 generates the position information relating to the position of the landmarks that are detected at the step S13 (the step S14). Note that the second example embodiment also describes the example in which the position correction unit 123 generates the landmark distance L at the step S14. Furthermore, the face direction calculation unit 122 calculates the face direction angle θ of the face of the human 100 included in the face image 101 based on the face image 101 (alternatively, the image part of the face image 101 that is included in the face region determined at the step S12) (the step S15).

Then, the position correction unit 123 calculates a regression expression that defines a relationship between the landmark distance L and the face direction angle θ based on the position information (the plurality of landmark distances L in this case) generated at the step S14 and the face direction angle θ calculated at the step S15 (a step S21). Namely, the position correction unit 123 performs a regression analysis for estimating the regression expression that defines the relationship between the landmark distance L and the face direction angle θ based on the plurality of landmark distances L generated at the step S14 and the face direction angle θ calculated at the step S15. Note that the position correction unit 123 may calculate the regression expression by using the plurality of landmark distances L that are calculated from the plurality of face images 101 in which various humans face directions based on various face direction angles θ at the step S21. Similarly, the position correction unit 123 may calculate the regression expression by using the plurality of face direction angles θ that are calculated from the plurality of face images 101 in which various humans face directions based on various face direction angles θ at the step S21.

Figure 18:
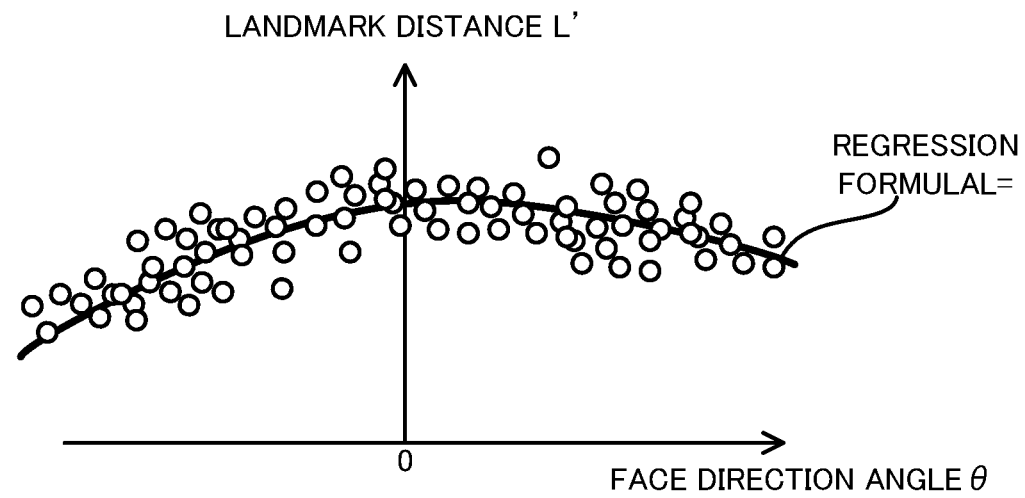
FIG. 18 is a graph that illustrates a relationship between an uncorrected landmark direction and a face direction angle.

FIG. 18 illustrates one example of a graph on which the plurality of landmark distances L generated at the step S14 and the face direction angle θ calculated at the step S15 are plotted. FIG. 18 illustrates the relationship between the landmark distance L and the face direction angle θ on the graph in which the landmark distance L is represented by a vertical axis and the face direction angle θ is represented by a horizontal axis. As illustrated in FIG. 18, it can be seen that there is a possibility that the landmark distance L that is not corrected by the face direction angle θ varies depending on the face direction angle θ. The position correction unit 123 may calculate the regression expression that represents the relationship between the landmark distance L and the face direction angle θ by a n-th (note that n is a variable number indicating an integer that is equal to or larger than 1) degree equation. In an example illustrated in FIG. 18, the position correction unit 123 calculates the regression expression ($L=a\times\theta^2+b\times\theta+c$) that represents the relationship between the landmark distance L and the face direction angle θ by a quadratic equation.

Figure 19:
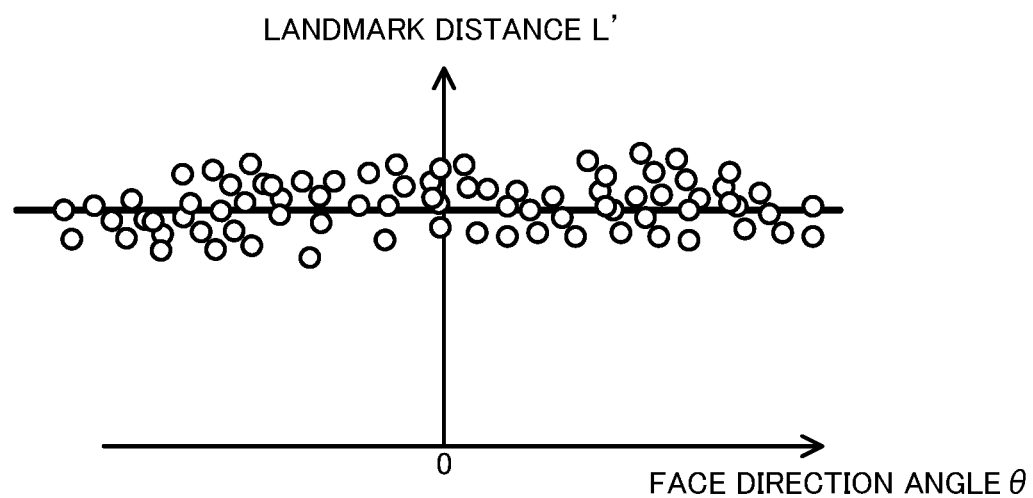
FIG. 19 is a graph that illustrates a relationship between a corrected landmark direction and a face direction angle.

Then, the position correction unit 123 corrects the position information (the plurality of feature distances L in this case) generated at the step S14 based on the regression expression calculated at the step S21 (a step S22). For example, as illustrated in FIG. 19 that is one example of a graph on which the corrected landmark distance L' and the face direction angle θ are plotted, the position correction unit 123 may correct the plurality of landmark distances L based on the regression expression so that the landmark distance L' that is corrected by the face direction angle θ does not vary depending on the face direction angle θ. Namely, the position correction unit 123 may correct the plurality of landmark distances L based on the regression expression so that the regression expression representing the relationship between the landmark distance L' and the face direction angle θ becomes an equation representing a line that is along the horizontal axis (namely, a coordinate axis corresponding to the face direction angle θ). For example, as illustrated in FIG. 19, the position correction unit 123 may correct the plurality of landmark distances L based on the regression expression so that a varied amount of the landmark distance L' due to the variation of the face direction angle θ is smaller than a varied amount of the landmark distance L due to the variation of the face direction angle θ. Namely, the position correction unit 123 may correct the plurality of landmark distances L based on the regression expression so that the regression expression representing the relationship between the landmark distance L' and the face direction angle θ is closer to the line than the regression expression representing the relationship between the landmark distance L and the face direction angle θ is. As one example, when the regression expression that defines the relationship between the landmark distance L and the face direction angle θ is expressed by the equation of $L=a \times \theta^2+b \times \theta+c$, the position correction unit 123 may correct the landmark distances L by using a fifth equation of $L'=L-a \times \theta^2-b \times \theta$.

Then, the action detection unit 124 determines whether or not the action unit occurs on the face of the human 100 included in the face image 101 based on the plurality of landmark distances L' (namely, the position information) corrected by the position correction unit 123 (the step S17).

As described above, the information processing system SYSb in the second example embodiment corrects the landmark distance L (namely, the position information relating to the position of the landmark) based on the regression expression that defines the relationship between the landmark distance L and the face direction angle θ instead of at least one of the first equation of L'=L/cos θ, the second equation of Lx'=Lx/cos θ_pan, the third equation of Ly'=Ly/cos θ_tilt and the fourth equation of L'=((Lx/cos θ_pan)^2+ (Ly/cos θ_tilt)^2)^(½). Even in this case, there is a lower possibility that the image processing apparatus 1 erroneously determines that a certain type of action unit occurs on the ground of the variation of the landmark distance L due to the variation of the direction of the face of the human 100, even when the action unit does not occur, compared to the case where the landmark distance L is not corrected based on the face direction angle θ. Thus, the image processing apparatus 1 can determine whether or not the action unit occurs with accuracy. Therefore, the information processing system SYSb in the second example embodiment can achieve an effect that is achievable by the above described information processing system SYS in the first example embodiment.

Especially, the information processing system SYSb can correct the landmark distance L by using a statistical method such as the regression expression. Namely, the information processing system SYSb can correct the landmark distance L statistically. Thus, the information processing system SYSb can correct the landmark distance L more properly, compared to a case where the landmark distance L is not corrected statistically. Namely, the information processing system SYSb can correct the landmark distance L so as to reduce a frequency with which the image processing apparatus 1 erroneously detects the action unit. Thus, the image processing apparatus 1 can determine whether or not the action unit occurs with more accuracy.

Incidentally, when the landmark distance L is corrected based on the regression expression, the position correction unit 123 may distinguish the landmark distance L the varied amount of which due to the variation of the face direction angle θ is relatively large (for example, is larger than a predetermined threshold value) from the landmark distance L the varied amount of which due to the variation of the face direction angle θ is relatively small (for example, is smaller than the predetermined threshold value). In this case, the position correction unit 123 may correct, by using the regression expression, the landmark distance L the varied amount of which due to the variation of the face direction angle θ is relatively large. On the other hand, the position correction unit 123 may not correct the landmark distance L the varied amount of which due to the variation of the face direction angle θ is relatively small. Then, the action detection unit 124 may determine whether or not the action unit occurs by using the landmark distance L' that is corrected because the varied amount due to the variation of the face direction angle θ is relatively large and the landmark distance L that is not corrected because the varied amount due to the variation of the face direction angle θ is relatively small. In this case, the image processing apparatus 1 can properly determine whether or not the action unit occurs while reducing a load necessary for correcting the position information. This is because the landmark distance L the varied amount of which due to the variation of the face direction angle θ is relatively small is considered to be a value that is close to a true value even when it is not corrected based on the regression expression (namely, it is not corrected based on the face direction angle θ). Namely, the landmark distance L the varied amount of which due to the variation of the face direction angle θ is relatively small is considered to be a value that is substantially equal to the corrected landmark distance L'. As a result, there is a relatively small necessity for correcting the landmark distance L the varied amount of which due to the variation of the face direction angle θ is relatively small. On the other hand, the landmark distance L the varied amount of which due to the variation of the face direction angle θ is relatively large is considered to be a value that is largely different from the true value when it is not corrected based on the regression expression. Namely, the landmark distance L the varied amount of which due to the variation of the face direction angle θ is relatively large is considered to be a value that is largely different from the corrected landmark distance L'. As a result, there is a relatively large necessity for correcting the landmark distance L the varied amount of which due to the variation of the face direction angle θ is relatively large. Considering this situation, the image processing apparatus can properly determine whether or not the action unit occurs even when only at least one landmark distance L the varied amount of which due to the variation of the face direction angle θ is relatively large is selectively corrected.

(5) Modified Example

Next, a modified example of the information processing system SYS will be described.

(5-1) Modified Example of Data Accumulation Apparatus 3

In the above described description, as illustrated in FIG. 13, the data accumulation apparatus 3 generates the landmark database 320 including the data record 321 that includes the landmark data field 3211, the attribute data field 3212 and the action unit data field 3213. However, as illustrated in FIG. 20 that illustrates a first modified example of the landmark database 320 (hereinafter, it is referred to as a "landmark database 320*a*") generated by the data accumulation apparatus 3, the data accumulation apparatus 3 may generate the landmark database 320*a* including the data record 321 that includes the landmark data field 3211 and the action unit data field 3213 and that does not include the attribute data field 3212. Even in this case, the data generation apparatus 2 can generate the face data 221 by selecting the landmark that is collected from the face image 301 that includes the face on which the desired type of action unit occurs for each of the plurality of facial parts and combining the plurality of landmarks that correspond to the plurality of facial parts, respectively. Alternatively, as illustrated in FIG. 21 that illustrates a second modified example of the landmark database 320 (hereinafter, it is referred to as a "landmark database 320*b*") generated by the data accumulation apparatus 3, the data accumulation apparatus 3 may generate the landmark database 320*b* including the data record 321 that includes the landmark data field 3211 and the attribute data field 3212 and that does not include the action unit data field 3213. Even in this case, the data generation apparatus 2 can generate the face data 221 by selecting the landmark that is collected from the face image 301 that includes the face having the desired attribute for each of the plurality of facial parts and combining the plurality of landmarks that correspond to the plurality of facial parts, respectively.

In the above described description, as illustrated in FIG. 13, the data accumulation apparatus 3 generates the landmark database 320 including the data record 321 that includes the attribute data field 3212 in which an information relating to a single type of attribute that is the face direction angle $\theta$ is stored. However, as illustrated in FIG. 22 that illustrates a third modified example of the landmark database 320 (hereinafter, it is referred to as a "landmark database 320*c*") generated by the data accumulation apparatus 3, the data accumulation apparatus 3 may generate the landmark database 320*c* including the data record 321 that includes the attribute data field 3212 in which an information relating to a plurality of different types of attributes is stored. In an example illustrated in FIG. 22, an information relating to the face direction angle $\theta$ and an information relating to the aspect ratio of the face are stored in the attribute data field 3212. In this case, the data generation apparatus 2 may set a plurality of conditions relating to the plurality of types of attributes at the step S22 in FIG. 14. For example, when the data generation apparatus 2 generates the face data 221 by using the landmark database 320*c* illustrated in FIG. 22, the data generation apparatus 2 may set a condition relating to the face direction angle $\theta$ and a condition relating to the aspect ratio of the face. Furthermore, at the step S23 in FIG. 14, the data generation apparatus 2 may randomly select the landmark of one part that satisfies all of the plurality of conditions relating to the plurality of types of attributes that are set at the step S22. For example, when the data generation apparatus 2 generates the face data 221 by using the landmark database 320*c* illustrated in FIG. 21, the data generation apparatus 2 may randomly select the landmark of one part that satisfies both of the condition relating to the face direction angle $\theta$ and the condition relating to the aspect ratio of the face. When the landmark database 320 including the landmark that is associated with the information relating to the different types of attributes is used, the data generation apparatus 2 can properly generate the face data 221 that indicates the landmark of the face of the virtual human 200 that provides less or no feeling of strangeness as the face of the human, compared to a case where the landmark database 320 including the landmark that is associated with the information relating to the single type of attribute is used.

(5-2) Modified Example of Data Generation Apparatus 2

The data generation apparatus 2 may set an arrangement allowable range of the landmark for each facial part when the face data 221 is generated by combining the plurality of landmarks that correspond to the plurality of facial parts, respectively. Namely, the data generation apparatus 2 may set the arrangement allowable range of the landmark of one facial part when the landmark of one facial part is disposed to constitute the virtual face. The arrangement allowable range of the landmark of one facial part may be set to be a range that includes a position that provides less or no feeling of strangeness as the position of one virtual facial part that constitutes the virtual face and that does not include a position that provides a feeling or a large feeling of strangeness as the position of one virtual facial part that constitutes the virtual face. In this case, the data generation apparatus 2 does not dispose the landmark outside the arrangement allowable range. As a result, the data generation apparatus 2 can properly generate the face data 221 that indicates the landmark of the face of the virtual human 200 that provides less or no feeling of strangeness as the face of the human, The data generation apparatus 2 may calculate an index (hereinafter, it is referred to as a "face index") that represents a face-ness of the face of the virtual human 200 that is represented by the landmarks indicated by the face data 221 after generating the face data 221. For example, the data generation apparatus 2 may calculate the face index by comparing the landmarks indicated by the face data 221 with landmarks that represent a feature of a reference face. In this case, the data generation apparatus 2 may calculate the face index so that the face index becomes smaller (namely, it is determined that the face of the virtual human 200 is determined not to be like a face or the feeling of strangeness thereof is large) as a difference between the landmarks indicated by the face data 221 with the landmarks that represent the feature of the reference face becomes larger.

When the data generation apparatus 2 calculates the face index, the data generation apparatus 2 may discard the face data 221 the face index of which is smaller than a predetermined threshold value. Namely, the data generation apparatus 2 may not store the face data 221 the face index of which is smaller than the predetermined threshold value in the storage apparatus 22. The data generation apparatus 2 may not include the face data 221 the face index of which is smaller than the predetermined threshold value in the learning data set 220. As a result, the learning of the learning model of the image processing apparatus 1 can be performed by using the face data 221 that indicates the landmark of the face of the virtual human 200 that is relatively closer to the face of the actual human. Thus, the learning of the learning model of the image processing apparatus 1 can be performed more properly, compared to a case where the learning of the learning model is performed by using the face data 221 that indicates the landmark of the face of the virtual human 200 that is different from the face of the actual human. As a result, the detection accuracy of the image processing apparatus 1 improves.

(5-3) Modified Example of Image Processing Apparatus 1

In the above described description, at the step S14 in each of FIG. 16 and FIG. 17, the image processing apparatus 1 calculates the relative positional relationship between at least two any landmarks of the plurality of landmarks detected at the step S13 in FIG. 16. However, the image processing apparatus 1 may extract at least one landmark that is related to the action unit to be detected from the plurality of landmarks detected at the step S13, and generate the position information relating to the position of at least one extracted landmark. In other words, the image processing apparatus 1 may extract at least one landmark that contributes to the detection of the action unit to be detected from the plurality of landmarks detected at the step S13, and generate the position information relating to the position of at least one extracted landmark. In this case, a load necessary for generating the position information is reduced.

Similarly, in the above described description, at each of the step S16 in FIG. 16 and the step S22 in FIG. 17, the image processing apparatus 1 corrects the plurality of landmark distances L (namely, the position information) calculated at the step S14 in FIG. 16. However, the image processing apparatus 1 may extract at least one landmark distance L that is related to the action unit to be detected from the plurality of landmark distances L calculated at the step S14, and correct at least one extracted landmark distance L. In other words, the image processing apparatus 1 may extract at least one landmark distance L that contributes to the detection of the action unit to be detected from the plurality of landmark distances L calculated at the step S14, and correct at least one extracted landmark distance L. In this case, a load necessary for correcting the position information is reduced.

Similarly, in the above described description, at the step S21 in FIG. 17, the image processing apparatus 1 calculates the regression expression by using the plurality of landmark distances L (namely, the position information) calculated at the step S14 in FIG. 17. However, the image processing apparatus 1 may extract at least one landmark distance L that is related to the action unit to be detected from the plurality of landmark distances L calculated at the step S14, and calculate the regression expression by using at least one extracted landmark distance L. In other words, the image processing apparatus 1 may extract at least one landmark distance L that contributes to the detection of the action unit to be detected from the plurality of landmark distances L calculated at the step S14, and calculate the regression expression by using at least one extracted landmark distance L. Namely, the image processing apparatus 1 may calculate a plurality of regression expressions that correspond to the plurality of types of action units, respectively. Considering that a variation aspect of the landmark distance L changes depending on the type of the action unit, the regression expression corresponding to each action unit is expected to indicate the relationship between the landmark distance L that is related to each action unit and the face direction angle $\theta$ with higher accuracy, compared to the regression expression that is common all of the plurality of types of action units. Thus, the image processing apparatus 1 can correct the landmark distance L that is related to each action unit with accuracy by using the regression expression corresponding to each action unit. Thus, the image processing apparatus 1 can determine whether or not each action unit occurs with accuracy.

Similarly, the above described description, at the step S17 in each of FIG. 16 and FIG. 17, the image processing apparatus 1 detects the action unit by using the plurality of landmark distances L' (namely, the position information) corrected at the step S16 in FIG. 16. However, the image processing apparatus 1 may extract at least one landmark distance L' that is related to the action unit to be detected from the plurality of landmark distances L' corrected at the step S16, and detect the action unit by using at least one extracted landmark distance L'. In other words, the image processing apparatus 1 may extract at least one landmark distance L' that contributes to the detection of the action unit to be detected from the plurality of landmark distances L' corrected at the step S16, and detect the action unit by using at least one extracted landmark distance L'. In this case, a load necessary for detecting the action unit is reduced.

In the above described description, the image processing apparatus 1 detects the action unit based on the position information (the landmark distance L and so on) relating to the position of the landmark of the face of the human 100 included in the face image 101. However, the image processing apparatus 1 (the action detection unit 124) may estimate (namely, determine) an emotion of the human 100 included in the face image based on the position information relating to the position of the landmark. Alternatively, the image processing apparatus 1 (the action detection unit 124) may estimate (namely, determine) a physical condition of the human 100 included in the face image based on the position information relating to the position of the landmark. Note that each of the emotion and the physical condition of the human 100 is one example of the state of the human 100.

When the image processing apparatus 1 estimate at least one of the emotion and the physical condition of the human 100, the data accumulation apparatus 3 may determine, at the step S34 in FIG. 5, at least one of the emotion and the physical condition of the human 300 included in the face image 301 obtained at the step S31 in FIG. 5. Thus, an information relating to at least one of the emotion and the physical condition of the human 300 included in the face image 301 may be associated with the face image 301. Moreover, the data accumulation apparatus 3 may generate the landmark database 320 including the data record 321 in which the landmark, at least one of the emotion and the physical condition of the human 300 and the face direction angle $\theta$ are associated at the step S36 in FIG. 5. Moreover, the data generation apparatus 2 may set a condition relating to at least one of the emotion and the physical condition at the step S22 in FIG. 14. Moreover, the data generation apparatus 2 may randomly select, at the step S23 in FIG. 14, the landmark of one facial part that satisfies the condition relating to at least one of the emotion and the physical condition that is set at the step S21 in FIG. 14. As a result, it is possible to prepare the huge number of face data 221 that correspond to the face images to each of which the ground truth label is assigned even in a situation where it is difficult to prepare the huge number of face images 301 that correspond to the face images to each of which the ground truth label is assigned, in order to perform a learning of a learnable learning model that is configured to output a result of the estimation of at least one of the emotion and the physical condition of the human 100 when the face image 101 is inputted thereto. Thus, the number of the learning data for the leaning model is larger than that in a case where the learning of the learning model of the image processing apparatus 1 is performed by using the face images 301 themselves. As a result, an estimation accuracy of the emotion and the physical condition by the image processing apparatus 1 improves.

Incidentally, when the image processing apparatus 1 estimates at least one of the emotion and the physical condition of the human 100, the information processing system 1 may detect the action unit based on the position information relating to the position of the landmark and estimates the facial expression (namely, the emotion) based on the combination of the type of the detected action unit.

In this manner, the image processing apparatus 1 may determine at least one of the action unit that occurs on the face of the human 100 included in the face image 101, the emotion of the human 100 included in the face image 101 and the physical condition of the human 100 included in the face image 101. In this case, the information processing system SYS may be used for a below described usage. For example, the information processing system SYS may provide, to the human 100, an advertisement of a commercial product and a service based on at least one of the determined emotion and physical condition. As one example, the action detection unit proves that the human 100 is tired, the information processing system SYS may provide, to the human 100, the advertisement of the commercial product (for example, an energy drink) that the tired human 100 wants. For example, the information processing system SYS may provide, to the human 100, the service for improving a QOL (Quality of Life) of the human 100 based on the determined emotion and physical condition. As one example, the action detection unit proves that the human 100 shows a sign of a dementia, the information processing system SYS may provide, to the human 100, a service for delaying an onset or progression of the dementia (for example, a service for activating a brain).

(6) Supplementary Note

At least a part of or whole of the above described example embodiments may be described as the following Supplementary Notes. However, the above described example embodiments are not limited to the following Supplementary Notes.

(6-1) Supplementary Note 1

An information processing system that is provided with:
a data accumulation collection apparatus; and
a data generation apparatus, wherein
the data accumulation apparatus is provided with:
a detecting device that detects, based on a face image in which a face of a human is included, a landmark of the face of the human as a first landmark;
an obtaining device that obtains a state information indicating a state of the human that includes at least one of an action unit relating to a motion of at least one of a plurality of facial parts that constitute the face of the human that is included in the face image, an emotion of the human that is included in the face image and a physical condition of the human that is included in the face image; and
a database generating device that generates a landmark database that includes a plurality of first landmarks with each of which the state information is associated and which are categorized by a unit of each of the plurality of facial parts,
the data generation apparatus is provided with:
a selecting device that selects at least one first landmark with which the state information that indicates that the state is a desired state is associated for each of the plurality of facial parts as a second landmark from the landmark database; and
a face data generating device that generates a face data that represents a characteristic of a face of a virtual human by using a plurality of second landmarks by combining the plurality of second landmarks that correspond to the plurality of facial parts, respectively, and that are selected by the selecting device.

(6-2) Supplementary Note 2

The information processing system according to the supplementary note 2 that is further provided with a determining device that determines an attribute of the human based on the face image,
the database generating device generating the landmark database that includes the plurality of first landmarks with each of which the state information and an attribute information relating to the attribute determined by the determining device are associated.

(6-3) Supplementary Note 3

The information processing system according to the supplementary note 2, wherein
the attribute includes an attribute that has such a property that a variation of the attribute results in a variation of at least one of a position, a shape and an outline of at least one of the plurality of facial parts that are included in the face image.

(6-4) Supplementary Note 4

The information processing system according to the supplementary note 2 or 3, wherein
the attribute includes a direction of the face.

(6-5) Supplementary Note 5

The information processing system according to any one of the supplementary notes 2 to 4, wherein
the attribute includes at least one of an aspect ratio of the face, a sex and a race.

(6-6) Supplementary Note 6

The information processing system according to any one of the supplementary notes 2 to 5, wherein
the selecting device selects at least one first landmark with which the state information that indicates that the state is the desired state and the attribute information that indicates that the attribute is a desired attribute are associated for each of the plurality of facial parts as the second landmark from the landmark database.

(6-7) Supplementary Note 7

The information processing system according to any one of the supplementary notes 2 to 6, wherein
the determining device determines, as the attribute, a first type of attribute and a second type of attribute that is different from the first type of attribute based on the face image,
the database generating device generates the landmark database that includes the plurality of first landmarks with each of which the state information and the attribute information relating to the first and second types of attributes determined by the determining device are associated.

(6-8) Supplementary Note 8

The information processing system according to any one of the supplementary notes 1 to 7, wherein
the human is the first human,
the face image is a first face image,
the detecting device is a first detecting device,
the information processing system is further provided with an image processing apparatus,
the image processing apparatus is provided with:
a second detecting device that detects, based on a second face image in which a face of a second human is included, a landmark of the face of the second human as a third landmark; and
a determining device that determines at least one of an action unit relating to a motion of at least one of a plurality of facial parts that constitute the face of the second human that is included in the second face image, an emotion of the second human that is included in the second face image and a physical condition of the second human that is included in the second face image based on the third landmark and a learning model that is learned by using the face data.

(6-9) Supplementary Note 9

A data accumulation apparatus that is provided with:

a detecting device that detects, based on a face image in which a face of a human is included, a landmark of the face of the human as a first landmark;

an obtaining device that obtains a state information indicating a state of the human that includes at least one of an action unit relating to a motion of at least one of a plurality of facial parts that constitute the face of the human that is included in the face image, an emotion of the human that is included in the face image and a physical condition of the human that is included in the face image; and a database generating device that generates a landmark database that includes a plurality of first landmarks with each of which the state information is associated and which are categorized by a unit of each of the plurality of facial parts.

(6-10) Supplementary Note 10

A data generation apparatus that is provided with:

a selecting device that selects, from a landmark database (i) that includes a plurality of first landmarks each of which is a landmark of a face of a human, (ii) in which a state information indicating a state of the human that includes at least one of an action unit relating to a motion of at least one of a plurality of facial parts that constitute the face of the human, an emotion of the human and a physical condition of the human is associated with each of the plurality of first landmarks, and (iii) in which the plurality of first landmarks are categorized by a unit of each of the plurality of facial parts, at least one first landmark with which the state information that indicates that the state is a desired state is associated for each of the plurality of facial parts as a second landmark; and a face data generating device that generates a face data that represents a characteristic of a face of a virtual human by using a plurality of second landmarks by combining the plurality of second landmarks that correspond to the plurality of facial parts, respectively, and that are selected by the selecting device.

(6-11) Supplementary Note 11

An information processing method that includes:

detecting, based on a face image in which a face of a human is included, a landmark of the face of the human as a first landmark;

obtaining a state information indicating a state of the human that includes at least one of an action unit relating to a motion of at least one of a plurality of facial parts that constitute the face of the human that is included in the face image, an emotion of the human that is included in the face image and a physical condition of the human that is included in the face image;

generating a landmark database that includes a plurality of first landmarks with each of which the state information is associated and which are categorized by a unit of each of the plurality of facial parts;

selecting at least one first landmark with which the state information that indicates that the state is a desired state is associated for each of the plurality of facial parts as a second landmark from the landmark database; and generating a face data that represents a characteristic of a face of a virtual human by using a plurality of second landmarks by combining the plurality of selected second landmarks that correspond to the plurality of facial parts, respectively.

(6-12) Supplementary Note 12

A data accumulation method that includes:

detecting, based on a face image in which a face of a human is included, a landmark of the face of the human as a first landmark;

obtaining a state information indicating a state of the human that includes at least one of an action unit relating to a motion of at least one of a plurality of facial parts that constitute the face of the human that is included in the face image, an emotion of the human that is included in the face image and a physical condition of the human that is included in the face image; and generating a landmark database that includes a plurality of first landmarks with each of which the state information is associated and which are categorized by a unit of each of the plurality of facial parts.

(6-13) Supplementary Note 13

A data generation method that includes:

selecting, from a landmark database (i) that includes a plurality of first landmarks each of which is a landmark of a face of a human, (ii) in which a state information indicating a state of the human that includes at least one of an action unit relating to a motion of at least one of a plurality of facial parts that constitute the face of the human, an emotion of the human and a physical condition of the human is associated with each of the plurality of first landmarks, and (iii) in which the plurality of first landmarks are categorized by a unit of each of the plurality of facial parts, at least one first landmark with which the state information that indicates that the state is a desired state is associated for each of the plurality of facial parts as a second landmark; and generating a face data that represents a characteristic of a face of a virtual human by using a plurality of second landmarks by combining the plurality of second landmarks that correspond to the plurality of facial parts, respectively, and that are selected by the selecting device.

(6-14) Supplementary Note 14

A recording medium on which a computer program that allows a computer to execute an information processing method is recorded, wherein the information processing method includes:

detecting, based on a face image in which a face of a human is included, a landmark of the face of the human as a first landmark;

obtaining a state information indicating a state of the human that includes at least one of an action unit relating to a motion of at least one of a plurality of facial parts that constitute the face of the human that is included in the face image, an emotion of the human that is included in the face image and a physical condition of the human that is included in the face image;

generating a landmark database that includes a plurality of first landmarks with each of which the state information is associated and which are categorized by a unit of each of the plurality of facial parts;

selecting at least one first landmark with which the state information that indicates that the state is a desired state is associated for each of the plurality of facial parts as a second landmark from the landmark database; and generating a face data that represents a characteristic of a face of a virtual human by using a plurality of second landmarks by combining the plurality of selected second landmarks that correspond to the plurality of facial parts, respectively.

(6-15) Supplementary Note 15

A recording medium on which a computer program that allows a computer to execute a data accumulation method is recorded, wherein the data accumulation method includes:

detecting, based on a face image in which a face of a human is included, a landmark of the face of the human as a first landmark;

obtaining state information indicating a state of the human that includes at least one of an action unit relating to a motion of at least one of a plurality of facial parts that constitute the face of the human that is included in the face image, an emotion of the human that is included in the face image and a physical condition of the human that is included in the face image; and generating a landmark database that includes a plurality of first landmarks with each of which the state information is associated and which are categorized by a unit of each of the plurality of facial parts.

(6-16) Supplementary Note 16

A recording medium on which a computer program that allows a computer to execute a data generation method is recorded, wherein the data generation method includes:

selecting, from a landmark database (i) that includes a plurality of first landmarks each of which is a landmark of a face of a human, (ii) in which a state information indicating a state of the human that includes at least one of an action unit relating to a motion of at least one of a plurality of facial parts that constitute the face of the human, an emotion of the human and a physical condition of the human is associated with each of the plurality of first landmarks, and (iii) in which the plurality of first landmarks are categorized by a unit of each of the plurality of facial parts, at least one first landmark with which the state information that indicates that the state is a desired state is associated for each of the plurality of facial parts as a second landmark; and generating a face data that represents a characteristic of a face of a virtual human by using a plurality of second landmarks by combining the plurality of second landmarks that correspond to the plurality of facial parts, respectively, and that are selected by the selecting device.

(6-17) Supplementary Note 17

A database that includes:

a first data field in which a data relating to a plurality of first landmarks each of which is a landmark of a face of a human is allowed to be stored; and a second data field in which a state information indicating a human state that includes at least one of an action unit relating to a motion of at least one of a plurality of facial parts that constitute the face of the human, an emotion of the human and a physical condition of the human is allowed to be stored, the state information being associated with each of the plurality of first landmarks and the plurality of first landmarks are categorized by a unit of each of the plurality of facial parts.

The present disclosure is allowed to be changed, if desired, without departing from the essence or spirit of the invention which can be read from the claims and the entire specification, and an information processing system, a data accumulation apparatus, a data generation apparatus, an image processing apparatus, an information processing method, a data accumulation method, a data generation method, an image processing method, a recording medium and a database, which involve such changes, are also intended to be within the technical scope of the present disclosure.

DESCRIPTION OF REFERENCE CODES

SYS information processing system
1 image processing apparatus
11 camera
12 arithmetic apparatus
121 landmark detection unit
122 face direction calculation unit
123 position correction unit
124 action detection unit
2 data generation apparatus
21 arithmetic apparatus
211 landmark selection unit
212 face data generation unit
22 storage apparatus
220 learning data set
221 face data
3 data accumulation apparatus
31 arithmetic apparatus
311 landmark detection unit
312 state/attribute determination unit
313 database generation unit
32 storage apparatus
320 landmark database
100, 300 human
101, 301 face image
θ, θ_pan, θ_tilt face direction angle

What is claimed is:

1. An information processing system comprising:
a data accumulation apparatus; and
a data generation apparatus,
the data accumulation apparatus comprising at least one first processor configured to execute instructions to:
detect, based on a first face image in which a face of a first human is included, a landmark of the face of the first human as a first landmark;
obtain a state information indicating a state of the first human that includes at least one of an action relating to a motion of at least one of a plurality of facial parts that constitute the face of the first human that is included in the first face image, an emotion of the first human that is included in the first face image and a physical condition of the first human that is included in the first face image; and
generate a landmark database that includes a plurality of first landmarks with each of which the state information is associated and which are categorized by a type of each of the plurality of facial parts,
the data generation apparatus comprising at least one second processor configured to execute instructions to:
select at least one first landmark with which the state information that indicates that the state is a desired state is associated for each of the plurality of facial parts as a second landmark from the landmark database; and
generate a face data that represents a characteristic of a face of a virtual human by using a plurality of second landmarks by combining the plurality of selected second landmarks that correspond to the plurality of facial parts, respectively.

2. The information processing system according to claim 1, wherein
the at least one first processor is further configured to execute the instructions to:
execute instructions to determine an attribute of the first human based on the first face image; and generate the landmark database that includes the plurality of first landmarks with, each of which the state information and an attribute information relating to the determined attribute.

3. The information processing system according to claim 2, wherein
the attribute includes an attribute that has such a property that a variation of the attribute results in a variation of at least one of a position, a shape and an outline of at least one of the plurality of facial parts that are included in the first face image.

4. The information processing system according to claim 2, wherein
the attribute includes a direction of the face.

5. The information processing system according to claim 2, wherein
the attribute includes an aspect ratio of the face.

6. The information processing system according to claim 2, wherein
the at least one second processor is further configured to execute the instructions to select at least one first landmark with which the state information that indicates that the state is the desired state and the attribute information that indicates that the attribute is a desired attribute are associated for each of the plurality of facial parts as the second landmark from the landmark database.

7. The information processing system according to claim 2, wherein
the at least one first processor is further configured to execute the instructions to:
determines, as the attribute, a first type of attribute and a second type of attribute that is different from the first type of attribute based on the first face image; and
generate the landmark database that includes the plurality of first landmarks with each of which the state information and the attribute information relating to the determined first and second types of attributes are associated.

8. The information processing system according to claim 2, wherein
the attribute includes a sex.

9. The information processing system according to claim 2, wherein
the attribute includes a race.

10. The information processing system according to claim wherein
the information processing system further comprises an image processing apparatus,
the image processing apparatus comprises at least one third processor configured to execute instructions to;
detects, based on a second face image in which a face of a second human is included, a landmark of the face of the second human as a third landmark; and
determine at least one of an action unit relating to a motion of at least one of a plurality of facial parts that constitute the face of the second human that is included in the second face image, an emotion of the second human that is included in the second face image and a physical condition of the second human that is included in the second face image based on the third landmark and a learning model that is learned by using the face data.

11. An information processing method comprising:
detecting, based on a first face image in which a face of a first human is included, a landmark of the face of the first human as a first landmark;
obtaining a state information indicating a state of the first human that includes at least one of an action relating to a motion of at least one of a plurality of facial parts that constitute the face of the first human that is included in the first face image, an emotion of the first human that is included in the first face image and a physical condition of the first human that is included in the first face image;
generating a landmark database that includes a plurality of first landmarks with each of which the state information is associated and which are categorized by a type of each of the plurality of facial parts:
selecting at least one first landmark with which the state information that indicates that the state is a desired state is associated for each of the plurality of facial parts as a second landmark from the landmark database; and
generating a face data that represents a characteristic of a face of a virtual human by using a plurality of second landmarks by combining the plurality of selected second landmarks that correspond to the plurality of facial parts, respectively.

12. A non-transitory recording medium on which a computer program that allows a computer to execute an information processing method is recorded,
the information processing method comprising:
detecting, based on a first face image in which a face of a first human is included, a landmark of the face of the first human as a first landmark;
obtaining a state information indicating a state of the first human that includes at least one of an action relating to a motion of at least one of a plurality of facial parts that constitute the face of the first human that is included in the first face image, an emotion of the first human that is included in the first face image and a physical condition of the first human that is included in the first face image;
generating a landmark database that includes a plurality of first landmarks with each of which the state information is associated and which are categorized by a type of each of the plurality of facial parts;
selecting at least one first landmark with which the state information that indicates that the state is a desired state is associated for each of the plurality of facial parts as a second landmark from the landmark database; and
generating a face data that represents a characteristic of a face of a virtual human by using a plurality of second landmarks by combining the plurality of selected second landmarks that correspond to the plurality of facial parts, respectively.

\* \* \* \* \*